(12) United States Patent
Utamura

(10) Patent No.: US 7,441,399 B2
(45) Date of Patent: Oct. 28, 2008

(54) GAS TURBINE, COMBINED CYCLE PLANT AND COMPRESSOR

(75) Inventor: Motoaki Utamura, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 1093 days.

(21) Appl. No.: 10/443,875

(22) Filed: May 23, 2003

(65) Prior Publication Data

US 2003/0196439 A1 Oct. 23, 2003

Related U.S. Application Data

(63) Continuation of application No. 09/960,358, filed on Sep. 24, 2001, now Pat. No. 6,581,368, which is a continuation of application No. 08/767,813, filed on Dec. 17, 1996, now Pat. No. 6,378,284.

(30) Foreign Application Priority Data

Dec. 28, 1995 (JP) ............................ 7-342070
Sep. 25, 1996 (JP) ............................ 8-252703

(51) Int. Cl.
*F02G 3/00* (2006.01)
*F02C 7/00* (2006.01)
(52) U.S. Cl. ........................... 60/39.3; 60/39.53
(58) Field of Classification Search ............ 60/39.53, 60/39.3, 775
See application file for complete search history.

(56) References Cited

U.S. PATENT DOCUMENTS 3,571,543 A 3/1971 Perkins et al.
3,894,691 A 7/1975 Mee
4,107,496 A 8/1978 Clason (Continued)

FOREIGN PATENT DOCUMENTS

EP 63248931 10/1988

(Continued)

OTHER PUBLICATIONS

Nolan et al, "Gas Turbine Performance Improvement Direct Mixing Evaporative Cooling System American Atlas Cogenration Facility Rifle, Colorado", ASME, 90-GT-368, Jun. 1990.*

(Continued)

*Primary Examiner*—Charles G Freay
(74) *Attorney, Agent, or Firm*—Mattingly, Stanger, Malur & Brundidge, P.C.

(57) ABSTRACT

A gas turbine, a combined cycle plant and compressor by which both augmentation of the power output and augmentation of the thermal efficiency can be realized by injecting liquid droplets into inlet air introduced into an entrance of a compressor with simple equipment which is suitable for practical use. The gas turbine includes a compressor for taking in and compressing gas, a combustor in which fuel is combusted with the gas discharged from the compressor, and a turbine driven by the combusted gas of the combustor. The gas turbine further includes a liquid droplet injection device provided on the upstream side of the compressor for injecting liquid droplets into inlet air to be supplied into the entrance of the compressor to lower the temperature of the inlet air to be introduced into the compressor so that the injected liquid droplets may be evaporated while flowing through the compressor.

8 Claims, 10 Drawing Sheets

U.S. PATENT DOCUMENTS

| | | | |
|---|---|---|---|
| 4,250,535 A | 2/1981 | Adolph et al. | |
| 4,418,527 A | 12/1983 | Schlom et al. | |
| 4,483,137 A | 11/1984 | Faulkner | |
| 4,667,465 A | 5/1987 | Munk | |
| 4,702,074 A | 10/1987 | Munk | |
| 4,731,990 A * | 3/1988 | Munk | 60/775 |
| 4,928,478 A | 5/1990 | Maslak | |
| 5,203,161 A | 4/1993 | Lehto | |
| 5,282,726 A | 2/1994 | Warren | |
| 5,353,585 A | 10/1994 | Munk | |
| 5,436,414 A | 7/1995 | Hodkin et al. | |
| 5,463,873 A | 11/1995 | Early et al. | |
| 5,525,268 A * | 6/1996 | Reens | 261/78.2 |
| 5,736,704 A | 4/1998 | Asselin et al. | |
| 5,790,972 A | 8/1998 | Kohlenberger | |
| 5,867,977 A | 2/1999 | Zachary et al. | |
| 5,930,990 A | 8/1999 | Zachary et al. | |

FOREIGN PATENT DOCUMENTS

| | | |
|---|---|---|
| EP | 0 524 435 A2 | 1/1993 |
| JP | 56-43433 | 9/1981 |
| JP | 61-37794 | 11/1986 |
| JP | 61-283723 | 12/1986 |
| JP | 2-211331 | 8/1990 |
| JP | 5-195809 | 8/1993 |
| JP | 6-10702 | 1/1994 |
| JP | 7-97933 | 4/1995 |

OTHER PUBLICATIONS

Slobodyanyuk, L.I., Effect of Water Spraying On Operation Of The Compressor Of A Gas Turbine Engine, Energeticka, No. 1, 1973, pp. 92-95.

Nolan et al, "Gas Turbine Performance Improvement Direct Mixing Evaporative Cooling System American Atlas, Rifle, Colorado", ASME 90-GT-368.

EPRI Technical Brief, "EPRI Technology to Enhance Cobustion Turbine Output".

Article entitled "Turbine Generator", By Mr. Kawabata, Jun. 2, 1981.

* cited by examiner

GAS TURBINE, COMBINED CYCLE PLANT AND COMPRESSOR

This is a continuation application of U.S. Ser. No. 09/960,358, filed Sep. 24, 2001, now U.S. Pat. No. 6,581,368 which is a continuation application of U.S. Ser. No. 08/767,813, filed Dec. 17, 1996 now U.S. Pat. No. 6,378,284.

BACKGROUND OF THE INVENTION

1. Field of the Invention

This invention relates to a gas turbine, and more particularly to a gas turbine wherein liquid droplets are injected into compressor inlet air of the gas turbine. The present invention further relates to a combined cycle plant, and more particularly to a combined cycle plant wherein liquid droplets are injected into inlet air of a compressor of the combined cycle plant. The present invention relates also to a compressor, and more particularly to a compressor wherein liquid droplets are injected into compressor inlet air.

2. Description of the Related Art

When the air temperature rises in summer or the like, the power output of a gas turbine drops, and various constructions are disclosed for a method of power recuperation.

In Japanese Patent Laid-Open Application No. Hei 7-97933, Japanese Utility Model Laid-Open Application No. Sho 61-37794 or Japanese Patent Laid-Open Application No. Hei 5-195809, it is disclosed to cool compressor inlet air.

Meanwhile, in Japanese Patent Laid-Open Application No. Sho 61-283723, it is disclosed to supply water from an entrance of a compressor and a mid stage of the compressor in a combined system of a gasification furnace and a gas turbine.

Further, in Japanese Utility Model Laid-Open Application No. Sho 56-43433, it is disclosed to provide a supply hole for water droplets in a compressor, and in Japanese Patent Laid-Open Application No. Hei 2-211331, a gas turbine which includes two high pressure and low pressure compressors and an intercooler provided between the compressors is disclosed. Meanwhile, in Japanese Patent Laid-Open Application No. Hei 6-10702, an apparatus is disclosed wherein, in a compressor group which includes a plurality of compressor stages, water is injected into an intermediate location between the compressor stage on the upstream and the compressor stage on the downstream in order to reduce power consumption.

However, Japanese Patent Laid-Open Application No. Hei 7-97933, Japanese Utility Model Publication Application No. Sho 61-37794 or Japanese Patent Laid-Open Application No. Hei 5-195809 merely discloses to drop the temperature of inlet air to be introduced into a compressor in order to augment the power output. Although it is disclosed in Japanese Patent Laid-Open Application No. Sho 61-283723 to evaporate liquid droplets during compression to utilize them as a medium for cooling the blades of a turbine and to augment the turbine cycle characteristic, it does not achieve both of power augmentation and thermal efficiency augmentation.

For a gas turbine, a combined cycle plant or a compressor, it is demanded to achieve both of power augmentation and thermal efficiency augmentation.

Meanwhile, in order to achieve both effects of augmentation of the power output and thermal efficiency augmentation as in Japanese Patent Laid-Open Application No. Hei 6-10702 or Japanese Patent Laid-Open Application No. Hei 2-21133, a specific equipment is required for a flow path of high pressure gas at an intermediate portion of a compressor, and there is a problem in that the compressor configuration is complicated and increased in scale as a whole. Further, in Japanese Utility Model Laid-Open Application No. Sho 56-43433, a casing and nozzles in a compressor are required to have a special construction.

Where an actual gas turbine, combined plant and compressor are taken into consideration, it is demanded that power augmentation and thermal efficiency augmentation can be achieved with simple equipment.

OBJECT AND SUMMARY OF THE INVENTION

It is an object of the present invention to provide a gas turbine, a combined plant and a compressor by which both of augmentation of the power output and augmentation of the thermal efficiency can be achieved by injecting liquid droplets into inlet air introduced into an entrance of a compressor.

In order to attain the object described above, according to an aspect of the present invention, there is provided a gas turbine, comprising a compressor for compressing and discharging gas supplied thereto, a combustor in which fuel is combusted with the gas discharged from the compressor, a turbine driven by the combusted gas of the combustor, and a liquid droplet injection device for injecting liquid droplets into gas to be supplied into the compressor to make the temperature of the gas to be introduced into the compressor lower than the temperature of external or ambient air so that the injected liquid droplets introduced into the compressor together with the gas may be evaporated while flowing through the compressor.

With the gas turbine, liquid droplets can be injected into inlet air to be introduced into the entrance of the compressor on power demand to achieve both of augmentation of the power output and augmentation of the thermal efficiency with simple equipment which is suitable for practical use.

According to another aspect of the present invention, there is provided a gas turbine, comprising a compressor for compressing and discharging gas supplied thereto, a combustor in which fuel is combusted with the gas discharged from the compressor, a turbine driven by the combusted gas of the combustor, and a liquid droplet injection device provided on the upstream side of the compressor for injecting liquid droplets primarily having droplet diameters of 50 μm or less into gas to be supplied to the compressor.

With the gas turbine, fine liquid droplets can be supplied into inlet air to the compressor by simple equipment which is suitable for practical use, and water droplets can be conveyed well by an inlet air flow to be supplied to the compressor. Accordingly, gas which contains liquid droplets can be transported efficiently from the entrance of the compressor into the compressor. Further, the liquid droplets introduced into the compressor can be evaporated in a good state. Consequently, augmentation of the power output and augmentation of the thermal efficiency can be achieved.

According to a further aspect of the present invention, there is provided a combined cycle plant, comprising a gas turbine including a compressor for compressing and discharging gas supplied thereto, a combustor in which fuel is combusted with the gas discharged from the compressor, a turbine driven by the combusted gas of the combustor, a heat recovery boiler for generating steam using exhaust gas from the turbine as a heat source, a steam turbine driven by the steam generated by the heat recovery boiler, and a liquid droplet injection device for injecting liquid droplets into gas to be supplied to the compressor of the gas turbine to make the temperature of the gas entering the compressor lower than the temperature of external or ambient air so that the injected liquid droplets introduced into the compressor together with the gas may be evaporated while flowing through the compressor.

With the combined cycle plant, the thermal efficiency can be augmented while also the power output can be augmented on power demand.

According to a still further aspect of the present invention, there is provided a compressor to which gas is supplied and which compresses and discharges the supplied gas, comprising a liquid droplet injection device for injecting liquid droplets into gas to be supplied to an entrance of the compressor to make the temperature of the gas entering the compressor lower than the temperature of external air so that the injected liquid droplets introduced into the compressor together with the gas may be evaporated while flowing down in the compressor.

With the compressor, driving power for the compressor can be reduced by simple equipment which is suitable for practical use.

According to a yet further aspect of the present invention, there is provided a liquid droplet injection device for injecting liquid droplets into gas to be supplied to a compressor of a gas turbine which includes the compressor for compressing and discharging gas supplied thereto, a combustor in which fuel is combusted with the gas discharged from the compressor, and a turbine driven by the combusted gas of the combustor, wherein the liquid droplet injection device injects liquid droplets to make the temperature of the gas entering the compressor lower than the temperature of external air so that the injected liquid droplets introduced into the compressor together with the gas may be evaporated while flowing through the compressor.

With the liquid droplet injection device, both of augmentation of the power output and augmentation of the thermal efficiency of a gas turbine or the like in which the present apparatus is disposed can be achieved.

The above and other objects, features and advantages of the present invention will become apparent from the following description and the appended claims, taken in conjunction with the accompanying drawings in which like parts or elements are denoted by like reference characters.

DESCRIPTION OF THE EMBODIMENTS OF THE INVENTION

A first embodiment of the present invention will be described with reference to FIG. 1.

Figure 1:
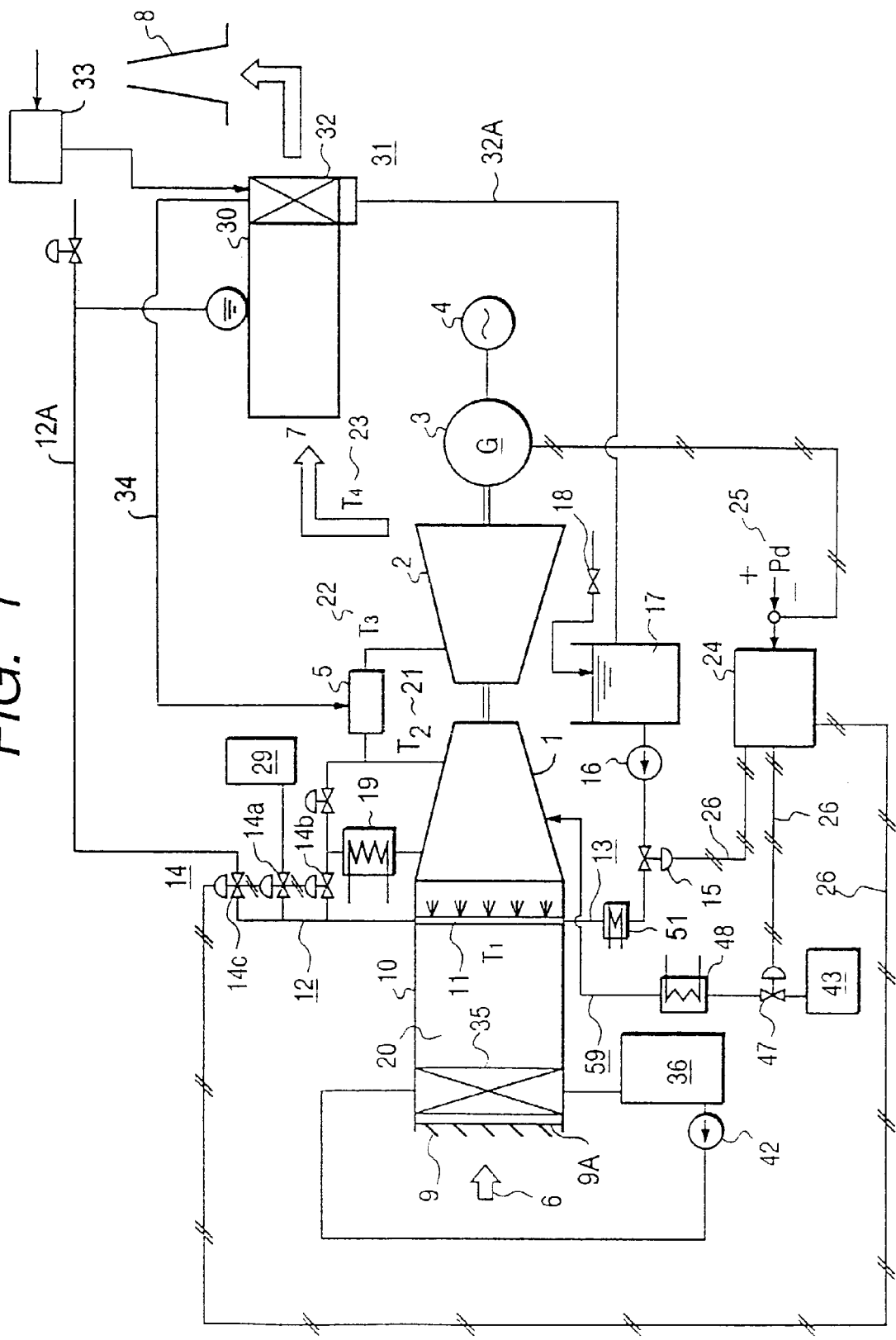
FIG. 1 is a schematic view of an embodiment of the present invention.

A gas turbine of the embodiment of the present invention includes, as shown in FIG. 1, a compressor 1 for compressing and discharging gas, a combustor 5 to which the gas compressed by the compressor 1 is supplied, a turbine 2 driven by the combustion gas from the combustor 5, a generator 3 connected to a shaft of the turbine 2, and a electric power grid 4 for transmitting power generated by the generator 3. Exhaust gas 7 from the gas turbine is discharged into the atmospheric air through a stack 8.

In the following embodiment, it is assumed that the gas supplied to the compressor 1 is air.

An inlet air compartment 10 for taking in inlet air 6 to be supplied to the compressor 1 is connected to the compressor 1. Usually, a louver 9 disposed on the upstream side of the inlet air compartment 10. An air filter 9A is disposed adjacent the louver 9 on the compressor side (rear flow side). The air filter is provided immediately rearwardly of the position of the louver 9.

While the form wherein the louver 9 is disposed on the upstream side of the inlet air compartment is shown in FIG. 1, where the air filter is located intermediately of the intake air compartment, the inlet air compartment 10 in the present embodiment presents an inlet air path to the entrance of the compressor on the downstream side of the air filter.

While the compressor 1, the turbine 2 and the generator 3 are connected to a common shaft in FIG. 1, the compressor 1 and the turbine 2 may otherwise have different shafts.

It is to be noted that, in FIG. 1, reference character T1 denotes an inlet air temperature 20 before the inlet air enters the compressor 1, T2 a compressor discharge air temperature 21, T3 a combustion temperature 22, and T4 an exhaust gas temperature 23 exhausted from the turbine 2.

Unless otherwise specified, those of numerals mentioned herein below which are same as those mentioned above denote the same objects.

The first embodiment further includes a liquid droplet injection device which discharges fine droplets into the inlet air compartment 10. For example, an atomizing nozzle 11 is disposed in the inlet air compartment. The Sauter mean particle diameter (S.M.D.) of liquid droplets discharged is, for example, approximately 10 μm. Feed water means 13 is connected to the atomizing nozzle 11. Where the atomizing nozzle 11 includes atomization means for producing such fine droplets, only the feed water means 13 may be connected, but atomization means may otherwise be provided in addition to the atomizing nozzle 11. A construction which includes separate atomization means will be hereinafter described in greater detail.

The feed water means 13 has a control valve 15 for controlling the flow rate, a feed water pump 16, a feed water tank 17, and a feed water equipment 18 for supplying water to the feed water tank 17.

The control valve 15 is electrically connected to a function generator 24 to which a signal based on the power output of the generator 3 and a load instruction signal Pd 25 are inputted via an addition section and which outputs an opening signal for the control valve 15 or the like and other instructions. The control valve 15 is communicated with the function generator 24 by a signal cable 26 or the like. In some cases, the load instruction signal Pd 25 may be introduced into the function generator 24.

The inlet air 6 passes through the louver 9 and comes into the inlet air compartment 10, and water of the feed water tank 17 passes through the control valve 15 of a predetermined opening and passes the feed water means 13 so that fine droplets are discharged from the atomizing nozzle 11. Where air supply from air supply means 12 is required in order to discharge fine droplets, a control valve 14 is additionally controlled to a predetermined opening to control the particle diameter of discharged liquid droplets. The inlet air 6 contains the liquid droplets to form a mist flow and enters the compressor 1 after the mist flow is partially evaporated to cool the inlet air. The liquid droplets contained in the inlet air are evaporated in the inside of the compressor 1 and cool the compressed air.

Figure 4:
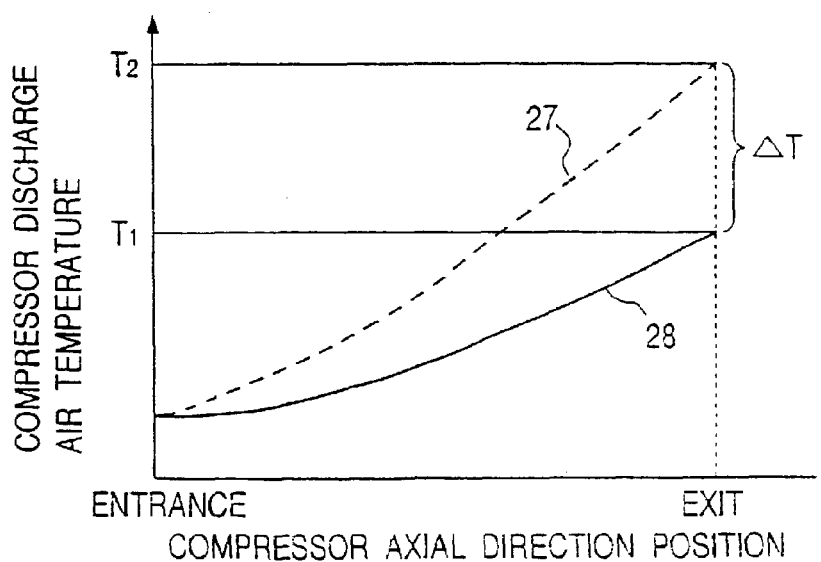
FIG. 4 is a diagram illustrating a temperature distribution of compressed air in a compressor.

FIG. 4 shows a temperature distribution of compressed air in the compressor. The air temperature T21 at the exit of the compressor 1 exhibits a larger amount of drop in a case 28 wherein water is injected and water droplets are evaporated in the compressor 1 than another case 27 wherein no water droplets are injected. Also in the compressor, the air temperature T21 exhibits a continuous drop.

After the liquid droplets are substantially evaporated in the compressor 1, the compressed air is mixed with fuel and the fuel is combusted in the combustor 5 to form gas of a high temperature and a high pressure, which flows into and works in the turbine 2. The mechanical energy of the turbine 2 is converted into electric energy by the generator 3, and the electric energy is fed to the electric power grid 4. The exhaust gas 7 after the work is completed is discharged into the atmospheric air through the stack 8.

By the present embodiment, power output augmentation can be achieved and thermal efficiency can be augmented.

The power output increasing mechanism according to the present embodiment can be summarized qualitatively in the following manner.

1) Cooling of inlet air, which is to be introduced into the compressor 1, along a constant wet bulb temperature line on a psychrometric chart in the inlet air compartment 10, 2) cooling of internal gas by evaporation of liquid droplets introduced into the compressor 1, 3) a difference between amounts of working fluid passing through the turbine 2 and the compressor 1 which corresponds to an evaporation amount in the compressor 1, 4) an increase in isobaric specific heat of mixture caused by mixture of air and steam which has a higher isobaric specific heat than that of pure air, and so forth.

Figure 11:
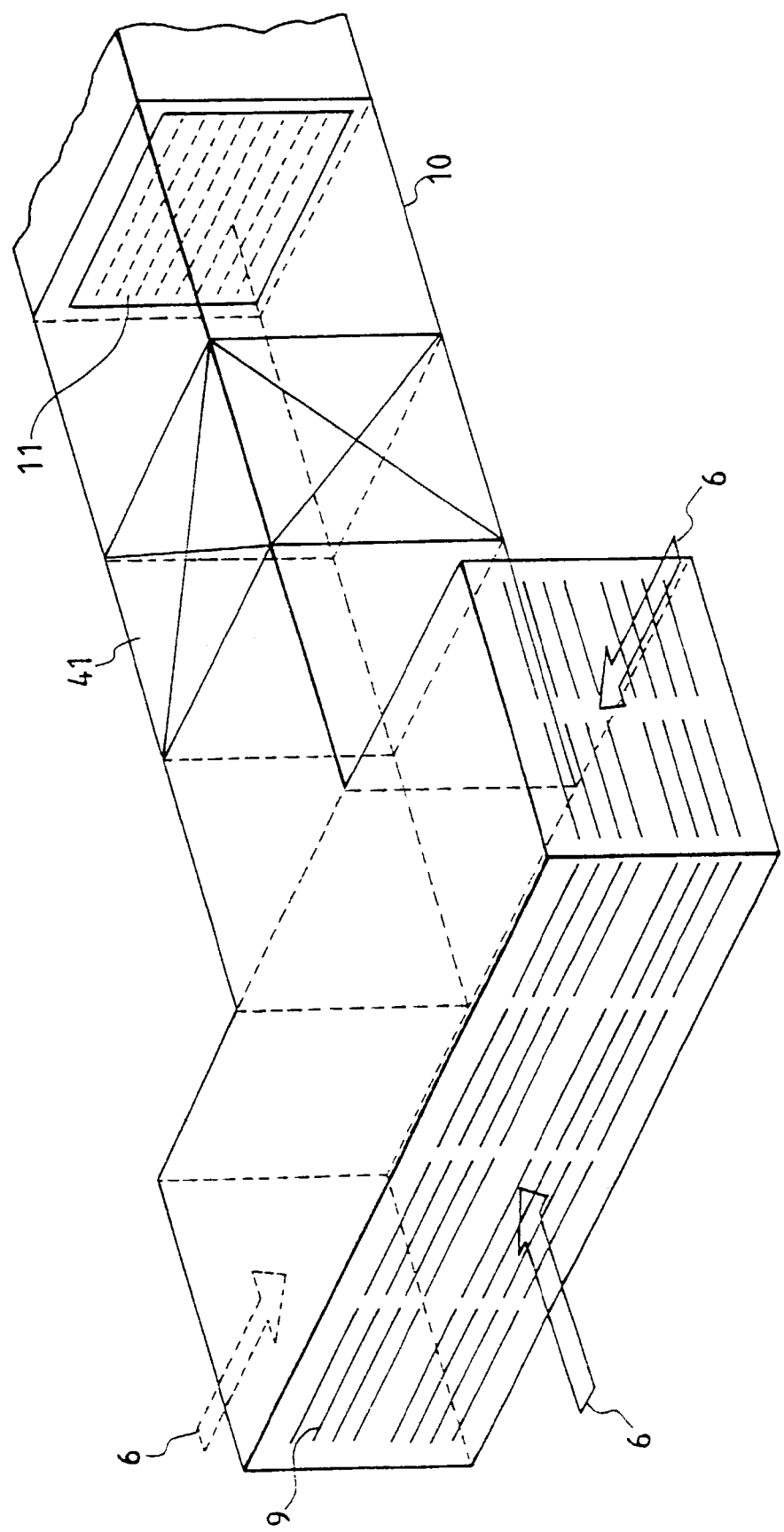
FIG. 11 is a schematic view showing an arrangement of atomizing nozzles in an inlet air compartment.
Figure 12:
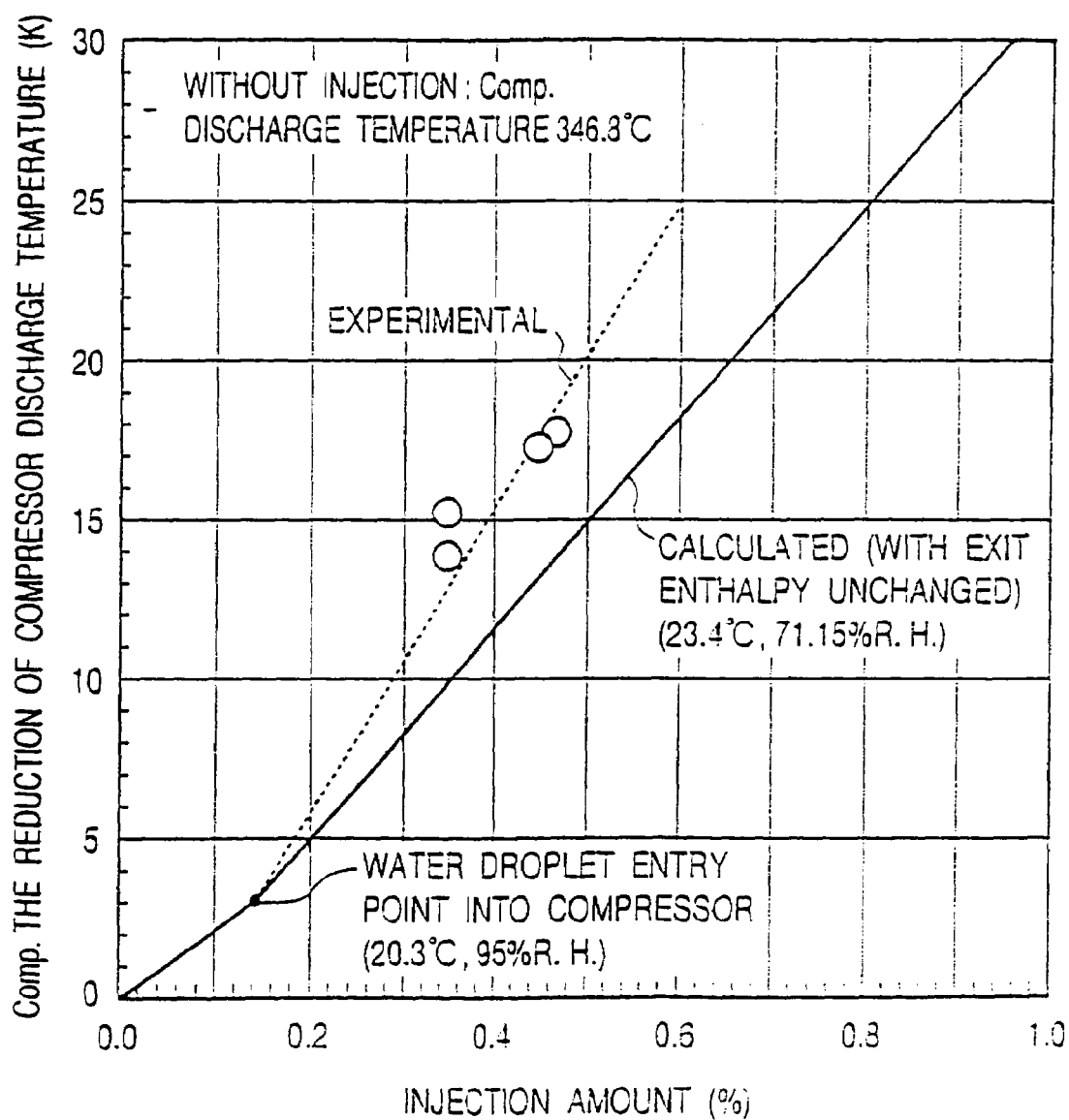

FIG. 11 shows an outline of arrangement of the atomizing nozzle 11 in the inlet air compartment 10.

A large number of atomizing nozzles 11 are arranged in a predetermined imaginary section of the inlet air flow path. For example, they are arranged in a plane substantially perpendicular to a flowing direction of inlet air. The atomizing nozzles 11 are arranged such that the distances between adjacent ones of them may be equal to each other in the longitudinal direction of the cross section of the inlet air path. Meanwhile, the atomizing nozzles 11 are arranged such that the distances between adjacent ones of them may be equal to each other in the lateral direction of the cross section of the inlet air flow path. As a whole, a large number of atomizing nozzles 11 can be arranged in a region of the inlet air compartment 10 forming the inlet air flow path except portions in the proximity of wall faces as seen in FIG. 11.

The distances between the adjacent ones of the injection nozzles can be set in a similar manner also in the other embodiments.

By the arrangement, water droplets can be distributed homogeneously into inlet air to be conveyed to the entrance of the compressor.

Meanwhile, in a conventional inlet air cooling apparatus which includes atomizing nozzles outside an inlet air compartment or on the upstream side of an air filter, since the evaporation efficiency is low, injection of a large amount of water is required, and therefore, a recovery apparatus which recovers almost all of injected liquid and a large scale circulation system which supplies the recovered liquid to the atomizing nozzles 11 again are provided usually. However, in the present embodiment, there is an advantage also in that, since the evaporation efficiency can be augmented to a value close to 1, no such large scale equipment need be provided.

The atomizing nozzles 11 are positioned on the downstream side with respect to the air filter of the louver 9. Consequently, the liquid droplets can be supplied on a flow of inlet air stably to the compressor 1. This is because the possibility that, where liquid droplets are supplied to the upstream side, water droplets may adhere to the air filter of the louver 9 or the air filter may suffer from choking can be suppressed.

Further, the atomizing nozzles 11 are preferably disposed at a distance from the entrance of the compressor 1 taking an evaporation amount when liquid droplets flow in the inlet air compartment 10 and so forth into consideration. Where a so-called IGV (inlet guide vane) is disposed at the entrance of the compressor 1, the atomizing nozzles 11 are disposed on the upstream side of the IGV. It is to be noted that, where a silencer or the like is provided, the atomizing nozzles 11 are positioned on the downstream side of the silencer or the like.

On the other hand, where the atomizing nozzles 11 are disposed in the proximity of the boundary between the compressor 1 and the inlet air compartment 10, if fine droplets are to be injected into the inlet air, it is easy to produce liquid droplets of small particle diameters to enter the compressor.

For example, evaporation of liquid droplets can begin with a stage nearer to the first stage side to effectively perform reduction of the driving power of the compressor.

Figure 8:
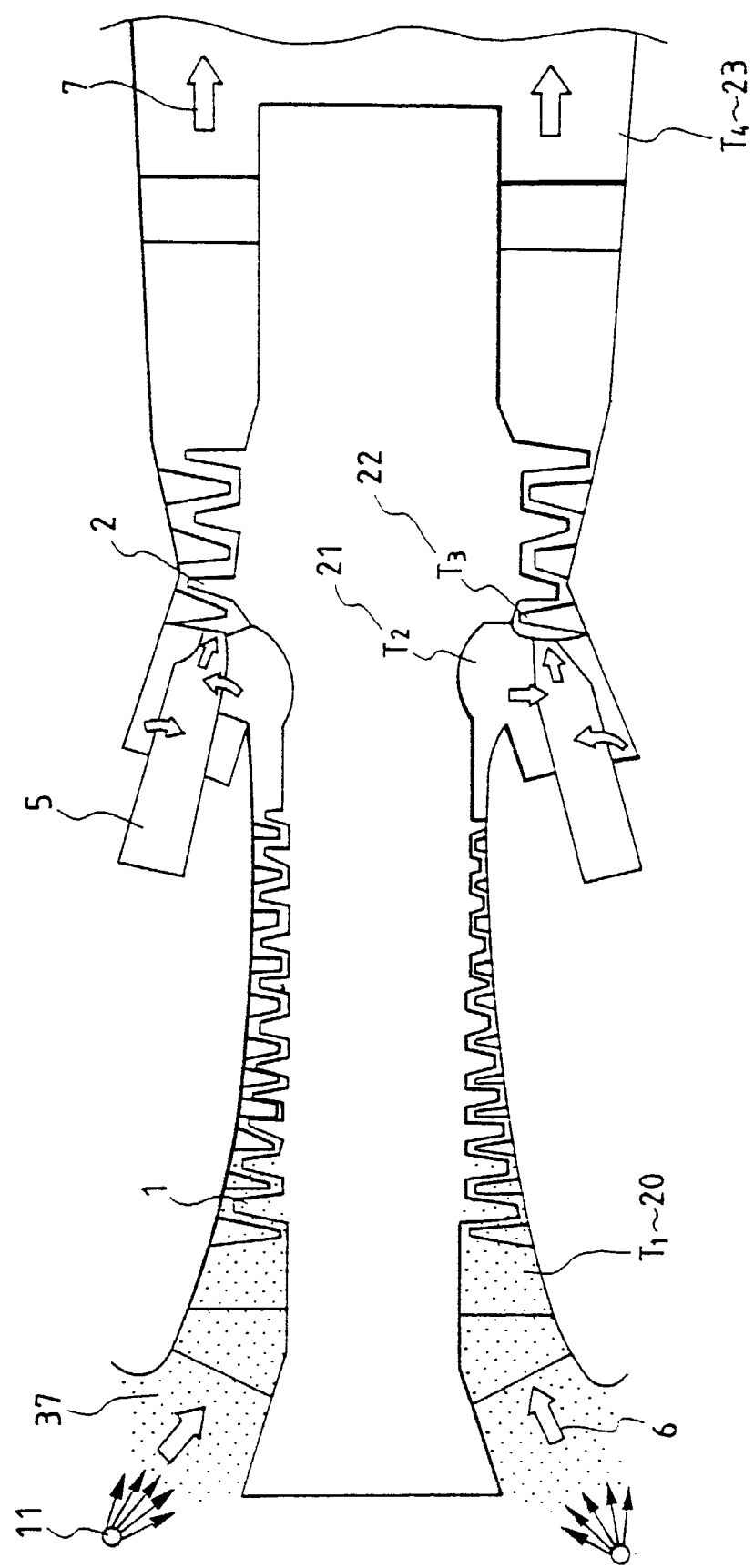
FIG. 8 is a schematic view showing a detailed structure of a gas turbine.

FIG. 8 is a schematic view showing a detailed structure of a gas turbine to which the present invention is applied. Liquid droplets injected into inlet air from the atomizing nozzles 11 flow on an air flow into the compressor through the entrance. The average air flow speed of inlet air flowing in the inlet air compartment is, for example, 20 m/s. Liquid droplets 37 move on gas paths of the compressor 1 along stream lines. In the compressor, the inlet air is heated by adiabatic compression, and while the liquid droplets are evaporated from the surfaces thereof by the heat, they are transported to the rear stage blade side while decreasing the particle diameters thereof. In this process, since the latent heat of evaporation necessary for evaporation is supplied from the air (sensible heat) in the compressor, the temperature of the air in the compressor drops by a larger amount than where the present invention is not applied (refer to FIG. 4). If the particle diameters of the liquid droplets are large, the liquid droplets will collide with the blades or the casing of the compressor 1 and acquire heat from the metal so that they are evaporated, and consequently, the temperature decreasing effect of the working fluid may possibly be hindered. Therefore, from such a point of view, preferably the particle diameters of liquid droplets are small.

A distribution in particle diameter is present with injected liquid droplets. From the point of view of suppression of collision with the blades or the casing of the compressor 1 or prevention of erosion of the blades, liquid droplets to be injected are controlled so that they may have particle diameters principally of 50 μm or less. From the point of view of reduction of an influence acting upon the blades, preferably the liquid droplets are controlled so that the largest particle diameter may be equal to or smaller than 50 μm.

Furthermore, since liquid droplets having smaller particle diameters can be distributed more homogeneously into flowing-in air, and from the point of view of suppression of production of a temperature distribution in the compressor, the particle diameters are preferably set to 30 μm or less in Sauter mean particle diameter (S.M.D.). Since liquid droplets injected from the injection nozzles have a distribution in grain size, measurement is not easy with the largest particle diameter mentioned above, and therefore, for practical use, a result of measurement with the Sauter mean particle diameter (S.M.D.) as described above can be used. It is to be noted that, although preferably the particle diameters are small, since the injection nozzles which produce liquid droplets of small particle diameters require a high precision production technique, the range of the particle diameter for practical use is defined by a technically available lower limit therefore, from such a point of view as just described, the lower limit to, for example, the principal particle diameter, the largest particle diameter or the average particle diameter is 1 μm. Further, since the energy for production of liquid droplets in most cases increases as the particle diameter thereof decreases, the lower limit may be determined by taking the energy used for production of liquid droplets into consideration. Where the particle diameter of liquid droplets is set to a value around which the liquid droplets float in the atmospheric air and do not drop readily, the liquid droplets usually exhibit good heat transfer characteristics.

As liquid droplets are evaporated, the mass flow rate of the working liquid increases. If the evaporation in the compressor is completed, then the gas in the compressor 1 is further subject to adiabatic compression. In this instance, since the isobaric specific heat of the water steam has a value substantially equal to twice that of the air around a representative temperature (300° C.) in the compressor, the water steam has an effect in heat capacity equivalent to that obtained where, in conversion into air, an amount of air having a weight approximately twice that of water droplets to be evaporated is increased as the working fluid. In particular, there is an effect (heat rise suppression effect) in drop of the discharge air temperature T2 of the compressor. An action that the discharge air temperature of the compressor is dropped by evaporation of water droplets in the compressor occurs in this manner. Since the power of the compressor is equal to a difference between enthalpies of air at the entrance and the exit of the compressor and the enthalpy of air increases in proportion to the temperature, as the air temperature at the exit of the compressor drops, the required work for the compressor can be reduced.

The working fluid (air) pressurized by the compressor is raised in temperature by combustion of fuel in the combustor and then flows into the turbine, in which it performs an expanding work. This work is called shaft power of the turbine and is equal to a difference between enthalpies of air at the entrance and the exit of the turbine. The supply amount of the fuel is controlled so that the gas temperature at the entrance of the turbine may not exceed a predetermined temperature. For example, a turbine entrance temperature is calculated from an exhaust gas temperature at the exit of the turbine and a measured value of the pressure Pcd at the exit of the compressor, and the fuel flow rate to the combustor 5 is controlled so that the calculated value may be equal to a value obtained before the present invention is applied. If such constant combustion temperature control is effected, then the fuel supply amount is increased by an amount corresponding to a drop of the gas temperature T2 at the exit of the compressor as described above. Further, if the combustion temperature is invariable and the weight ratio of injected water is approximately several percent with respect to the inlet air, since the pressure at the entrance of the turbine and the pressure at the exit of the compressor are approximately equal before and after injection is performed, also the gas temperature T4 at the exit of the turbine does not exhibit a variation. Consequently, the shaft power of the turbine does not exhibit a variation before and after injection. On the other hand, since the net power output of the gas turbine is a difference of the power of the compressor from the shaft power of the turbine, after all, by applying the present invention, the net power output of the gas turbine can be increased by an amount corresponding to a reduced amount of the power of the compressor.

The electric output QE of the turbine 2 is obtained by subtracting the work Cp (T2−T1) of the compressor 1 from the shaft power Cp (T3−T5) of the turbine 2 and can be represented approximately by the following expression (1):

$$Q_E/C_P = T3 - T4 - (T2 - T1) \tag{1}$$

Normally, since operation is performed so that the combustion temperature T3 may be constant the gas turbine output temperature T4 does not exhibit a variation, and also the shaft power Cp (T3−T4) of the turbine is constant. In this instance, if the compressor exit temperature T2 drops to T2' (<T2) as a result of mixture of water mist, a power increase T2−T2' equivalent to a drop of the work of the compressor is obtained. Meanwhile, the thermal efficiency η of the gas turbine is given approximately by the following expression (2):

$$\eta = 1 - \frac{T4 - T1}{T3 - T2} \tag{2}$$

In this instance, since T2'<T2, the second term on the right side is small, and it can be seen that also the thermal efficiency is augmented by injection of water. In other words, while the heat energy Cp (T4−T1) (the numerator of the second term of the expression 2) exhausted from a heat engine, that is, the gas turbine, to the outside of the system does not exhibit a great difference before and after application of the present invention, where the present invention is applied, the fuel energy Cp (T3−T2') supplied increases by an amount equal to Cp (T2−T2'), that is, a drop of the work of the compressor. Meanwhile, since the amount of the drop of the work of the compressor is equal to the power output increase as described above, it is considered that the increased amount of the fuel substantially entirely contributes to an increase of the power output of the gas turbine. In this manner, the increased amount of the power output provides a thermal efficiency of 100%. Consequently, the thermal efficiency of the gas turbine can be augmented. In this manner, in the present embodiment, in order to reduce the work of the compressor which is not disclosed explicitly in the prior art wherein inlet air is cooled, an increase of the total power output of the gas turbine can be anticipated by mixing water mist into inlet air of the compressor 1. On the other hand, while the prior art wherein water is injected into the entrance of a combustor contemplates increase of the power output by increasing the working fluid, since the work of the compressor 1 is not decreased, the thermal efficiency is dropped conversely.

Figure 7:
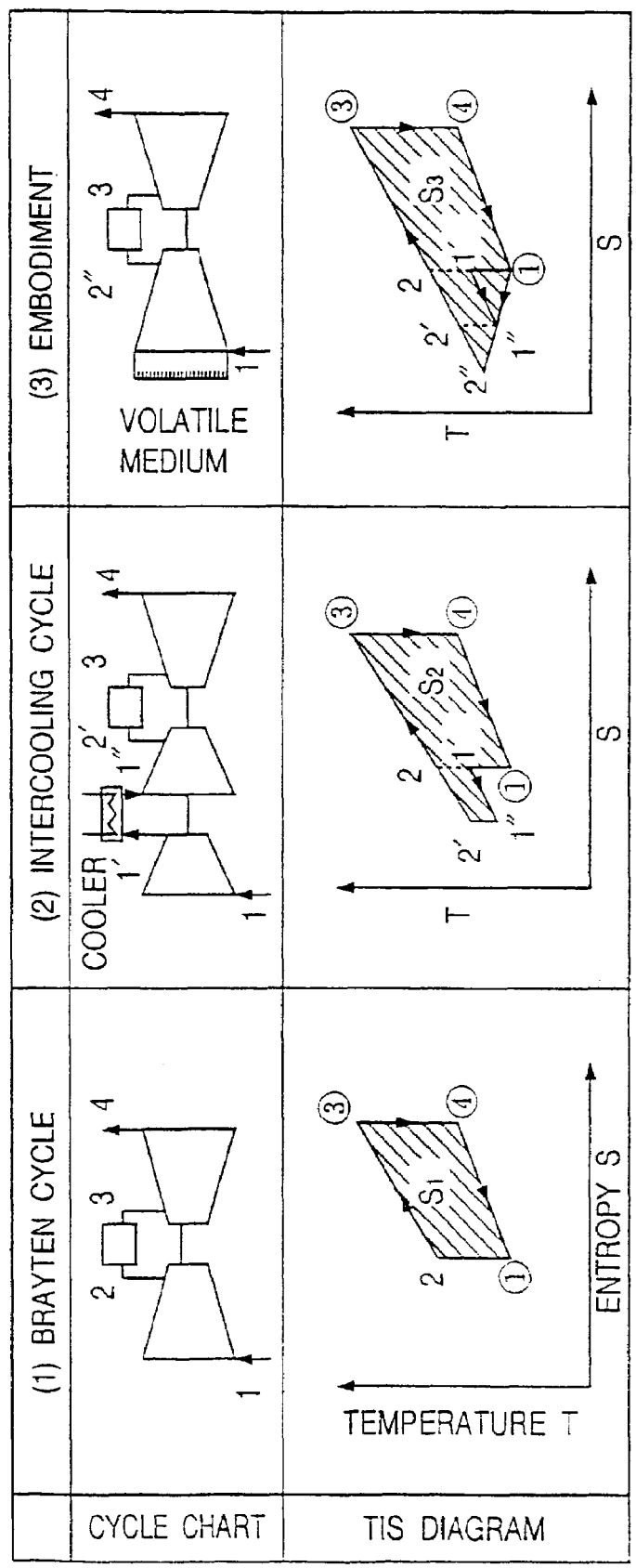
FIG. 7 is a diagrammatic view illustrating thermal cycle diagrams of the present invention and other methods for comparison.

FIG. 7 illustrates a heat cycle of the present invention and another heat cycle for comparison. The area of a closed region of a cycle chart indicates a gas turbine power output per unit inlet air flow rate, that is, a specific power output. Reference numerals in FIG. 7 denote the working fluid at the corresponding locations of the cycle charts. In FIG. 7, reference numeral 1 denotes the entrance of the compressor, 1' the entrance to an intercooler from the first stage compressor, 1" the entrance of the second stage compressor after working fluid goes out from the intercooler, 2 the entrance of the combustor in a Brayton cycle, 2' the entrance of the combustor after the working fluid goes out from the second stage compressor, 3 the entrance of the turbine after the working fluid goes out from the combustor, and 4 the exit of the turbine.

The temperature T—entropy S charts in the lower stage of FIG. 7 illustrate comparison in characteristic where the values of the temperature T—entropy S at the positions 1, 3 and 4 of the cycles described above are fixed.

As seen from FIG. 7, the magnitude of the specific power output decreases in order of that obtained by injecting fine water droplets mentioned hereinabove in an inlet air compartment of a compressor to introduce water droplets through the entrance of the compressor as in the present embodiment, that obtained by such an intercooling cycle as disclosed in Japanese Patent Laid-Open Application No. Hei 6-10702, and that obtained by an ordinary Brayton cycle. Particularly, the difference between the specific power outputs by the intercooling cycle and the present invention originates from the fact that, according to the present invention, water droplets introduced into the compressor are continuously evaporated from the entrance portion of the compressor, and this appears in the shapes of the cycles.

While the thermal efficiency of the intercooling cycle is inferior to that of the Brayton cycle, the present embodiment is superior to the Brayton cycle as described hereinabove, and consequently, the present invention achieves a higher thermal efficiency than the intercooling cycle.

Generally, as the position at which injected liquid droplets are evaporated in the compressor 1 approaches the entrance of the compressor 1, the air temperature at the exit of the compressor 1 drops, which is superior in terms of increase in power output and thermal efficiency augmentation. Accordingly, where the method wherein injected liquid droplets are mixed into the inlet air 6 is employed, the effect increases as the particle diameters of the injected liquid droplets decrease. This is because mist is evaporated quickly after it flows into the compressor 1. Further, the injected liquid droplets float in the air and are introduced smoothly into the compressor together with the inlet air.

Consequently, liquid droplets injected from the atomizing nozzles 11 preferably have such a size that substantially all of them are evaporated before they come to the exit of the compressor 1. Practically, the size of liquid droplets may be such that they are evaporated by less than 100% but by an upper limit which can be achieved by the construction described above. In practical use, liquid droplets should be evaporated by 90% or more at the exit of the compressor.

For example, when the discharge pressure Pcd of the compressor 1 is 0.84 MPa, if the evaporation ratio is calculated taking a correlation between measurement values of an absolute humidity at the exit of the compressor 1 and another absolute humidity at the position of IGV estimated from the ambient conditions into consideration, then the liquid droplets are evaporated by 95% or more before they come to the exit of the compressor.

The time within which air passes through the compressor is short, and in order to allow liquid droplets to be evaporated well within the time to raise the evaporation efficiency, preferably the particle diameter of the liquid droplets should be 30 μm or less in Sauter mean particle diameter (S.M.D.).

It is to be noted that, since atomizing nozzles which make liquid droplets of small particle diameters require a manufacturing technique of a high degree of accuracy, the lower limit to the particle diameter is given by a lower limit which can be achieved technically. Accordingly, the lower limit to the particle diameter is, for example, 1 μm.

This is because, where the liquid droplets are excessively large, it is difficult to evaporate liquid droplets well by the compressor.

The amount of liquid droplets to be introduced can be adjusted by the temperature and the humidity or a degree of the increase of the power output. Taking an amount by which injected liquid droplets are evaporated within a range from the injection location to the entrance of the compressor into consideration, liquid droplets can be introduced by an amount equal to or more than 0.2 weight % of the mass of the inlet air. The upper limit is determined so that the functions of the compressor can be maintained good. For example, the upper limit may be set to 5 weight %, and the range of introduction can be set lower than 5 weight %.

While adjustment is possible taking a summer season or the like or a drying condition or the like into consideration, in order to achieve a further increase in power output and so forth, liquid droplets may be introduced by a rate equal to or higher than 0.8 weight % but equal to or lower than 5 weight Comparing with a conventional liquid droplet injection device of the type wherein liquid droplets (for example, 100 to 150 μm and so forth) are merely injected into introduced air in order to lower the temperature of air to be introduced into the entrance of a compressor and, after the injection, the water is recovered and utilized for injection again, it is required to inject only a small amount of liquid droplets in the present embodiment.

The consumption amount of injection water exhibits a maximum used amount where the power output drops when it is high in temperature in summer and is to be recuperated to a rated power output. The consumption amount of pressurized air when air is supplied upon formation of mist cannot be ignored and should preferably be smaller than the consumption water amount as a target. Accordingly, only if the particle diameter condition is satisfied, is it economical that no air is supplied to form liquid droplets of the particle diameter mentioned above.

Based on the present embodiment, a generating plant which can suppress a variation of the power output all through a year can be provided by controlling the flow rate of mist in response to the ambient temperature. For example, the opening of the control valve 15 is adjusted so that the flow rate of mist is increased when the temperature of air to be introduced into the compressor is high compared with that when the air temperature is low.

Further, preferably the system is operated so that the liquid droplets are supplied upon equal combustion temperature operation. By this, the thermal efficiency can be augmented and the power output can be augmented.

Further, in a gas turbine which is not used for generation or a gas turbine for obtaining torque when it is driven, the combustion temperature can be lowered to lower the power output of the shaft of the turbine. Particularly upon part load operation, the present embodiment can be applied to save the fuel.

In the present embodiment, within a range higher than a level to which the power output is restricted from the ambient temperature, the power output can be controlled in response to a requested load.

Further, since the power output can be augmented even if the combustion temperature is not raised, a gas turbine which has a long life can be provided.

Further, according to the present embodiment, gas in the compressor can be cooled. Consequently, where this is utilized to use bleed extraction of the compressor for cooling the blades of the gas turbine, the bleed extraction amount for cooling can be reduced. Further, since the amount of the working fluid in the gas turbine can be increased by this, a high thermal efficiency and increase in power output can be anticipated.

In FIG. 1, the load instruction signal Pd 25 can be set to a rated value so that the flow rate of injected liquid droplets may be automatically controlled.

Subsequently, an operation method and control of the gas turbine will be described.

When it is intended to increase the power output of the gas turbine, the step of increasing the amount of liquid to be injected from the atomizing nozzles 11 and the step of increasing the amount of fuel to be supplied to the combustor are used. On the other hand, when it is intended to decrease the power output of the gas turbine, the amount of liquid to be injected is decreased and the amount of fuel to be supplied to the combustor is decreased.

When it is intended to increase the power output of the gas turbine, the amount of fuel to be supplied to the combustor is increased after the amount of the liquid to be injected is increased. On the contrary, when it is intended to decrease the power output of the gas turbine, the amount of fuel to be supplied to the combustor is decreased before the amount of liquid to be injected from the atomizing nozzles 11 is decreased.

An example of operation when the gas turbine is in a base load operation state will be described below.

Question control when operation with a fixed combustion temperature is performed may be such as follows. The function generator 24 calculates an injection water amount so as to correspond to an aimed power output based on a load instruction signal Pd 25 and issues an instruction to increase the opening to the control valve 15. The function generator 24 further calculates a compressed air amount necessary for a predetermined amount of water to be introduced via the control valve 15 to and injected by the atomizing nozzles 11 and necessary for predetermined particle diameters to be obtained, and issues an instruction to increase the opening to the control valve 15. Consequently, a predetermined amount of compressed air is introduced into the atomizing nozzles 11 through the control valve 15. Meanwhile, the fuel flow rate is maintained fixed. Subsequently, exhaust gas temperature control is entered to increase the fuel flow rate so that the combustion temperature (an estimated value may be used) may become equal to its aimed value.

An exhaust gas temperature control curve which presents an aimed value for the exhaust gas temperature during operation may be represented by a function of the compressor discharge pressure Pcd and the injection amount or may be an ordinary control curve applied for a case wherein no injection is involved. Alternatively, a value obtained by adding a suitable bias to an aimed exhaust gas temperature estimated from an ordinary control curve may be used.

When the power output of the gas turbine reached in this manner has a deviation from its aimed value, if the power output is to be increased, the injection amount is increased in accordance with the procedure described above, whereafter exhaust gas temperature control is entered. On the other hand, if the power output is to be decreased, the fuel flow rate is reduced first, and then the injection amount is decreased.

Where the function generator 24 which effects such control as described above is provided, the power output can be adjusted while preventing the situation that the combustion temperature exceeds its allowable value.

It is to be noted that, when the power output is to be decreased, the decreasing of the injection amount may be performed sufficiently slowly comparing with the increasing of the injection amount which is performed when the power output is to be increased in such a manner that the fuel flow rate is decreased in accordance with exhaust gas temperature control similar to that for the increasing of the power output.

In order to realize an aimed power output, instead of continuously varying the injection amount as described above, operation may be performed setting the injection amount to a predetermined value taking an amount of rise of the power output based on measured values of ambient conditions such as an ambient temperature and a humidity into consideration. For example, the injection amount or the like is calculated as a function of the ambient temperature, the humidity and an amount of rise of the power output and is set to a desired value. Consequently, also constant injection amount operation wherein the injection amount is not varied in response to a small variation of the power output or a variation of the air temperature becomes possible. The present system has an effect in that operation control is facilitated. Further preferably, after a predetermined time elapses after the setting described hereinabove, the ambient conditions are measured again, and re-setting of the injection amount is performed to allow adjustment of the amount of rise of the power output comparatively readily in conformity with the ambient conditions.

The operation of the gas turbine described above may be recognized also as control of the water droplet injection device for injecting water droplets into inlet air to be supplied to the compressor 1 of the gas turbine. Where the water droplet injection device is operated in such a manner as described above, the effect described above can be provided to a gas turbine in which the water droplet injection device is disposed.

The embodiment of FIG. 1 further may include an atomization means for obtaining liquid droplets of the fine particle diameters described above together with the atomizing nozzles 11. The atomization means includes means for supplying pressurized air to the atomizing nozzles 11.

More particularly, in addition to the atomizing nozzles 11 provided with feed water means 13, air supply means 12 are provided for supplying pressurized air to the atomizing nozzles 11. The air supply means 12 includes an accumulator 29 provided separately from the compressor 1 for supplying pressurized air, and includes a path which introduces pressurized air from the accumulator 29 to the atomizing nozzles 11 via a control valve generally indicated by the numeral 14. The control valve 14 controls the flow rate of gas to the atomizing nozzles 11. Specifically, a control valve 14a for controlling the amount of pressurized air to be supplied to the injection nozzles is provided.

The control valve 14 and the control valve 15 are electrically connected to a function generator 24 which receives a signal based on the power output of the generator 3 and a power demand signal Pd 25 via an addition section and outputs opening signals for the control valve 14, the control valve 15 and so forth and other instructions. The control valve 14 and the control valve 15 are connected to the function generator 24, for example, by a signal cable 26 or the like. Depending upon the case, the power demand signal 25 may be introduced directly to the function generator 24.

Inlet air 6 comes to the inlet air compartment 10 through the louver 9, and water of the feed water tank 17 passes through the control valve 15 of a predetermined opening and is supplied to the atomizing nozzles 11 through the feed water means 13. Further, pressurized air produced by the accumulator 29 is supplied to the atomizing nozzles 11 through the control valve 14 of a predetermined opening. Then, fine liquid droplets are injected from the atomizing nozzles 11. The nozzles may be of the type wherein the amounts of air and liquid to be supplied can be adjusted to adjust the particle diameters in a desired range within the range described hereinabove. The inlet air 6 contains the liquid droplets to form a mist flow and flows into the compressor 1 after part of the mist flow is evaporated to cool the inlet air. The liquid droplets contained in the inlet air are evaporated in the inside of the compressor 1 and cool the compressed air.

After the liquid droplets are substantially evaporated in the compressor 1, the fuel is mixed and combusted with the compressed air in the combustor 5 to produce gas of a high temperature and a high pressure, which then flows into and works in the turbine 2. The mechanical energy is converted into electric energy by the generator 3, and the electric energy is fed to the electric power grid 4. The exhaust gas 7 after completing the work is discharged to the atmospheric air through the stack 8.

Since the separate accumulator 29 is provided, the power of the compressor is not decreased, and in addition to the effects of augmentation of the power output of the gas turbine and augmentation of the thermal efficiency of the gas turbine, a further effect is sometimes provided from the point of view of an arrangement or from the point of view of power saving.

Further, though not shown in the drawings, the accumulator 29 may supply gas from an atomization compressor for supplying compressed air.

For the nozzles described above, air mist nozzles of the internal mixing type with which liquid droplets of a desired particle diameter can be obtained, may be used.

Upon operation and control of the gas turbine, when it is intended to increase the power output of the gas turbine, in addition to the increase of the amount of water to be injected as described above, the amount of air to be supplied to the atomizing nozzles 11 may be increased so that the particle diameter of liquid droplets injected from the injection nozzles may be of a desired size.

When decreasing the power output, the amount of liquid to be supplied to the atomizing nozzles 11 is decreased and the amount of air to be supplied to the atomizing nozzles 11 is decreased to adjust the particle diameter of liquid droplets.

Further, in order to facilitate operation, the amount of air and the amount of liquid to be supplied to the atomizing nozzles 11 are not adjusted, but only the amount of liquid to be supplied may be adjusted while the air amount is fixed.

In this instance, the amount of air to be supplied is adjusted so that a desired particle diameter of liquid droplets may be obtained when an allowable maximum amount of liquid is supplied. Consequently, when the amount of liquid to be injected is lower than the maximum injection liquid amount therefore, the diameter of the liquid droplets is reduced from that obtained when the amount of water is the maximum injection water amount, and a good condition can be obtained.

Further, in addition to the accumulator 29 described above or without the separate provision of the accumulator 29, the following construction may be employed.

The air supply means 12 includes a path which communicates bleed extraction from a mid stage of the compressor 1 with the atomizing nozzles 11 or another path which is branched from a path along which compressed air discharged from the compressor 1 flows and is communicated with the atomizing nozzles 11. The path includes a control valve 14b for controlling the amount of pressurized air to be supplied. In conformity with a demand to make injection effective or a like demand, the path may have a cooler 19 for adjusting the temperature of compressed air to a desired temperature.

Consequently, where the arrangement described above is provided together with the accumulator 29, the power of the accumulator 29 installed separately can be reduced by first using bleed extraction from the mid stage or discharged air and then using compressed air from the accumulator 29 for a short amount. Further, where the construction previously described is employed in place of the accumulator 29, simplification of the equipment can be anticipated.

Further, in the construction wherein compressed air from the mid stage of the compressor 1 or compressed air discharged from the compressor 1 is supplied in order to atomize liquid droplets as described above, in a process of start up of a plant or when the ambient temperature is extremely low, only supply air is supplied. Consequently, in the former case, operation wherein the discharged amount of NOx is controlled can be performed, but in the latter case, the inlet air temperature can be raised, and operation wherein icing can be prevented can be performed.

In particular, in the construction which includes the control valve 14b described above, the control valve 15 is closed while only the control valve 14b is opened so that only a desired amount of liquid droplets can be injected into inlet air.

As liquid droplets are supplied from the atomizing nozzles 11, they can be injected homogeneously into the inlet air, and the temperature distribution of the inlet air can be made homogeneous.

The embodiment further may include water recovery equipment 31 installed at an exhaust section of the turbine 2 and, in order to recover water in turbine exhaust gas and re-utilize the water as injection water, it further includes a path for supplying water recovered by the water recovery equipment 31 to the feed water tank 17.

For the recovery equipment, equipments which make use of various principals such as steam condensation by cooling or physical absorption can be adapted.

Inlet air 6 passes through the louver 9 and comes into the inlet air compartment 10, and water recovered by the water recovery equipment 31 is stored once into the water supply tank and then passes through the control valve 15 of a predetermined opening and then through the feed water means 13 so that fine droplets are thereafter injected from the atomizing nozzles 11. Where air supply from the air supply means 12 is necessary to inject the fine droplets, the control valve 14 is simultaneously set to a predetermined opening to adjust the particle diameter of injected liquid droplets. The inlet air 6 contains the liquid droplets to form a mist flow, and the mist flow enters the compressor 1 after part of it is evaporated to cool the inlet air. The liquid droplets contained in the inlet air are evaporated in the inside of the compressor 1 to cool the compressed air.

After the liquid droplets are substantially evaporated in the compressor 1, fuel is mixed with the compressed air and combusted in the combustor 5 to produce gas of a high temperature and a high pressure, which then flows into the works in the turbine 2. The mechanical energy is converted into electrical energy by the generator 3, and the electrical energy is supplied to the electric power grid 4. The exhaust gas after completion of the work is discharged into the atmospheric air through the stack 8.

Accordingly, in addition to the effects of augmentation of the power output of the gas turbine and augmentation of he thermal efficiency of the gas turbine, water can be utilized effectively, and saving of water can be achieved.

It is to be noted that, in a gas turbine plant which includes a heat recovery boiler 30, the water recovery efficiency can be augmented by disposing the water recovery equipment 31 described above at the exit of the heat recovery boiler 30.

The fuel for the combustor 5 may be liquefied natural gas (LNG). Consequently, the embodiment may include a liquefied natural gas storage section 33 which serves also as a cold heat source, and includes, as the water recovery equipment 31, a heat exchanger 32 for raising the temperature of natural gas supplied from the liquefied natural gas storage section 33 to evaporate the natural gas and a path 34 for introducing the evaporated natural gas to the combustor 5. The heat exchanger 32 is installed so as to utilize exhaust gas of the gas turbine.

Further, the heat exchanger 32 recovers water in the exhaust gas. In order to recover water in the exhaust gas and re-utilize the water as injection water, the heat exchanger 32 includes a path 32A for supplying the water recovered by the heat exchanger 32 to the feed water tank 17.

Here, in addition to the effects of augmentation of the power output of the gas turbine and augmentation of the thermal efficiency of the gas turbine, such effects that an equipment for evaporation of LNG is unnecessary and that water can be recovered are obtained. Also effective utilization of non-utilized energy is achieved.

The present embodiment also may include a combination of water injection into inlet air and inlet air cooling equipment.

Specifically, a cooling coil 35 connected to an external cold heat source 36 is provided on the rear face of the louver 9 and a cold heat medium is circulated by a pump 42. The cooling coil 35 may otherwise be disposed on the front face of the louver 9.

Inlet air 6 passes through the louver 9 and comes into the inlet air compartment 10, whereafter it is cooled when it passes the cooling coil 35, and water of the feed water tank 17 passes through the control valve 15 of a predetermined opening and further through the feed water means 13 so that fine liquid droplets are thereafter injected from the atomizing nozzles 11. Where air supply from the air supply means 12 is necessary to inject the fine droplets, the control valve 14 is simultaneously set to a predetermined opening to adjust the particle diameter of injected liquid droplets. The inlet air 6 contains the liquid droplets to form a mist flow, and the mist flow flows into the compressor 1 after part of it is evaporated to cool the inlet air. The liquid droplets contained in the inlet air are evaporated in the inside of the compressor 1 to cool the compressed air.

After the liquid droplets are substantially evaporated in the compressor 1, fuel is mixed with the compressed air and combusted in the combustor 5 to make gas of a high temperature and a high pressure, which flows into and works in the turbine 2. The mechanical energy is converted into electrical energy by the generator 3, and the electrical energy is fed to the electric power grid 4. The exhaust gas 7 after completion of the work is discharged into the atmospheric air through the stack 8.

In the present equipment, in addition to the effects of augmentation of the power output of the gas turbine and augmentation of the thermal efficiency of the gas turbine which are achieved by the embodiment, increase of the power output is achieved by a synergetic effect of increase of the inlet air mass flow rate by cooling of the inlet air and decrease of the work of the compressor 1 by injection of water. Typically, by setting the capacity of the cooling coil 35 so that it can cool to a dew point at which inlet air cooling can operate efficiently, a high increased power output can be obtained while saving water.

The present embodiment is advantageous where it is applied to a district in which shortage of water is forecast in summer.

Figure 2:
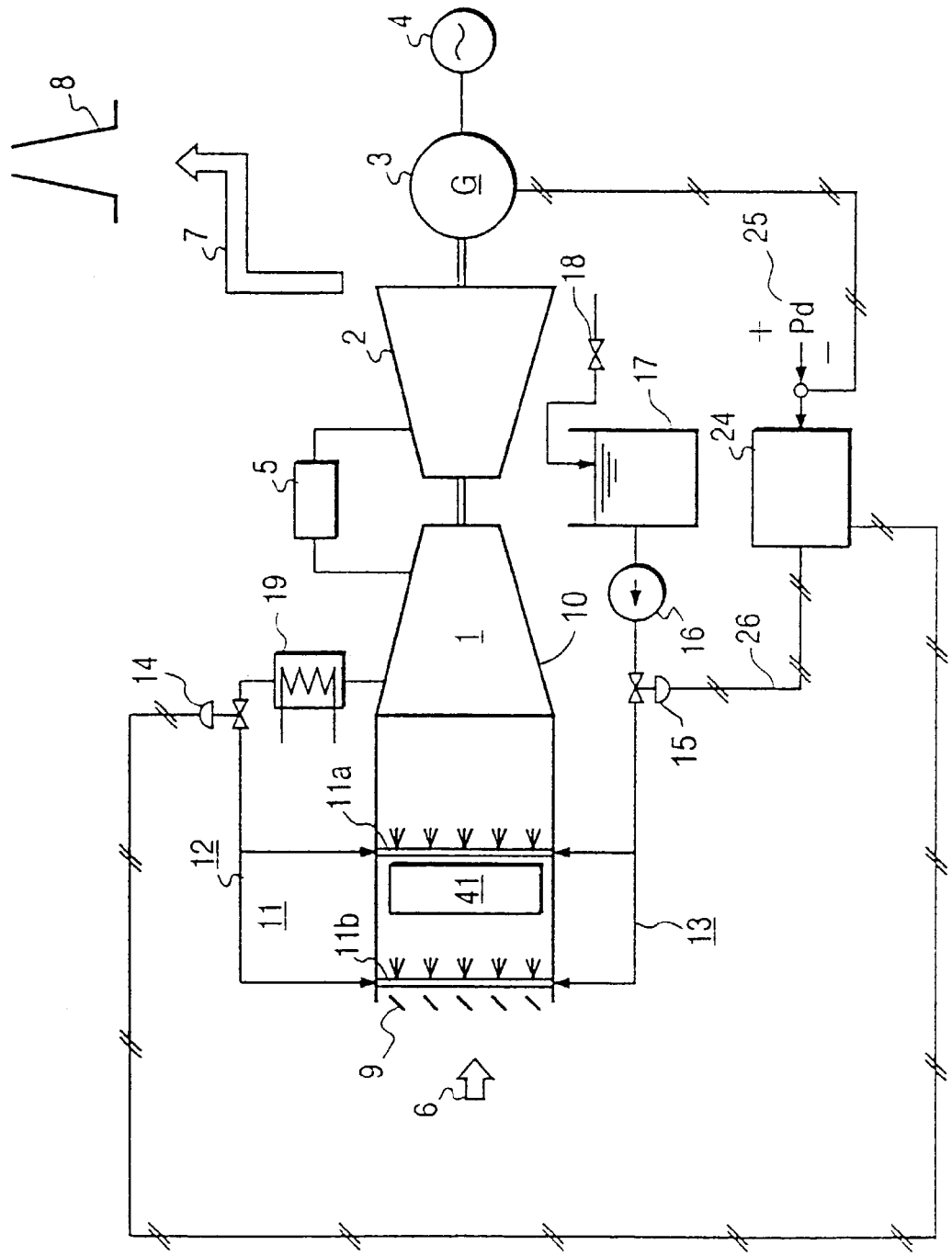
FIG. 2 is a similar view showing another embodiment of the present invention.

A second embodiment of the present invention will be described with reference to FIG. 2. This embodiment clearly indicates, comparing with the first embodiment, that the atomizing nozzles 11 are positioned in the inlet air compartment adjacent the louver 9. FIG. 2 shows the atomizing nozzles 11 so as to facilitate understanding of the position of them. While FIG. 2 shows a construction which includes air supply means 12 for supplying pressurized inlet air, such air supply means 12 as in the embodiment 1 need not be provided only if such desired liquid droplets as described above are obtained.

From the point of view to promote evaporation prior to flowing in to the compressor 1 to raise the efficiency in cooling of inlet air, preferably the atomizing nozzles 11 are disposed in a spaced relationship from the entrance of the compressor 1 in this manner.

Describing in more detail, the atomizing nozzles 11 are suitably disposed at one of the positions 11a or 11b.

Where the inlet air compartment 10 includes a silencer 41, the atomizing nozzles 11a are disposed on the downstream side of the silencer 41.

Consequently, also a sound insulating material can be prevented from being wet by the silencer. The atomizing nozzles 11 are preferably installed at a distance to the compressor taking a flying distance over which liquid droplets are evaporated before they are introduced into the compressor into consideration. Alternatively, the atomizing nozzles 11b may be disposed on the upstream side of the silencer.

For example, where the atomizing nozzles 11b are disposed in the proximity and on the downstream side of the louver 9 in the inlet air compartment, the distribution of water droplets in the inlet air can be made more homogeneous before the water droplets enter the compressor. Further, where a portion of the louver 9 extends wider than the inlet air compartment 10 on the downstream of the louver 9 or a like case, installation or maintenance of the atomizing nozzles 11 is easy.

Where the inlet air compartment 10 does not include a silencer, the atomizing nozzles 11 are positioned between the louver 9 and the entrance of the compressor 1. The atomizing nozzles 11 are preferably installed at a distance to the compressor taking into consideration a flying distance over which liquid droplets are evaporated before they are introduced into the compressor.

Inlet air 6 passes through the louver 9 and comes into the inlet air compartment 10, and then, where a silencer is present, the inlet air 6 passes through the silencer. Meanwhile, water from the feed water tank 17 passes through the control valve 15 of a predetermined opening and further through the feed water means 13 so that fine liquid droplets are injected from the atomizing nozzles 11. Where air supply from the air supply means 12 is necessary to inject fine liquid droplets, the control valve 15 is simultaneously set to a predetermined opening to adjust the particle diameter of injected liquid droplets. The inlet air 6 contains the liquid droplets to form a mist flow and flows into the compressor 1 after it cools the inlet air. The liquid droplets contained in the inlet are evaporated in the inside of the compressor 1 and cool the compressed air.

Consequently, recuperation of the power output of the gas turbine can be performed further efficiently by a synergetic effect of the two principles of increase of the inlet air mass flow rate and reduction of the compressor work by cooling of inlet air.

More particularly, if the injection nozzles are arranged at a location spaced by suitable distance from the entrance of the compressor in the inlet air compartment, then since part of the injected water is evaporated to cool the inlet air to a temperature in the proximity of the wet bulb temperature, similar effects are exhibited although some difference may be present from those obtained where an air cooler is installed in an inlet air flow path. The working fluid of the compressor 1 can be cooled effectively both inside the compressor 1 and outside the compressor 1, and the power output increase can be made larger where the distance is provided than where the atomizing nozzles 11 are arranged in the proximity of the entrance of the compressor.

Figure 5:
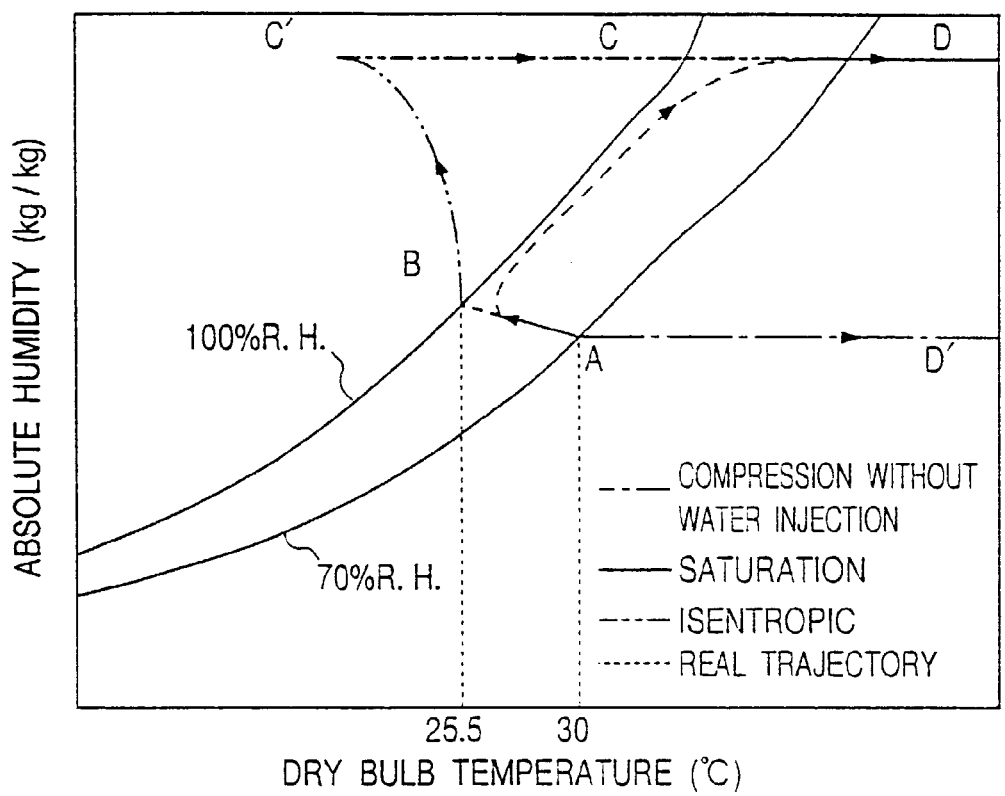
FIG. 5 is a diagram illustrating a relationship between the air temperature and the absolute humidity on a psychrometric chart in a compressor process.
Figure 6:
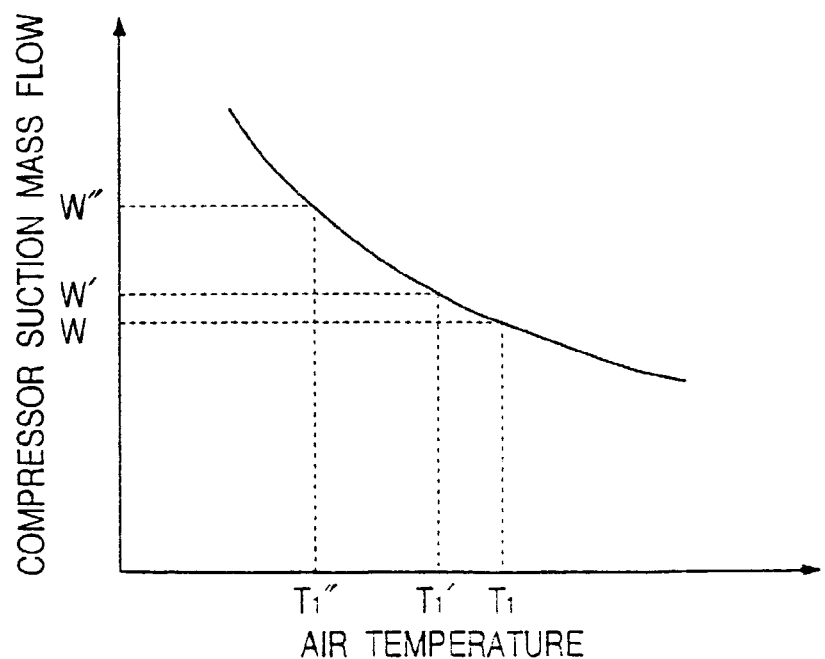
FIG. 6 is a diagram illustrating a relationship between the inlet air temperature and the inlet air mass flow rate.

FIGS. 5 and 6 illustrate a status variation of the working fluid and a relationship between the inlet air temperature and the inlet mass flow rate in the process wherein external air is introduced into and compressed by the compressor 1, respectively.

FIG. 5 illustrates a status variation where the ambient conditions are set to 30° C. and 70% in relative humidity (R.H.).

The ambient condition is indicated by a point A. If it is assumed that external air is evaporatively cooled along a constant wet bulb temperature line on a psychrometric chart until it enters a saturation state before it flows into the compressor, then the state of the inlet air changes to a state B at the entrance of the compressor 1. The humidity of gas to be introduced into the compressor 1 by injection of liquid droplets described above is preferably raised approximately to 90% or more from the point of view to maximize evaporation prior to introduction into the compressor. From the point of view to achieve better cooling of inlet air, the humidity should be raised to 95% or more. Those liquid droplets which have not been evaporated in the inlet air compartment 10 are continuously evaporated in the compression process from B to C. If it is assumed that saturation is kept during the process of evaporation, then boiling is completed with the state C, and in the process from C to D, single phase compression is entered and the temperature rises. If it is assumed that evaporation is an isoentropic process, the boiling end point comes to supersaturation of the state C'. Since the evaporation rate from liquid droplets is actually finite, it is considered that the state variation is non-isothermal and follows a locus of a broken line displaced from a saturation line. In contrast, in an ordinary compression process, the status traces the locus from A to D'.

Where, in FIG. 5, the temperature at A is represented by T1 and the temperature at B is represented by T1', the inlet air flow rate increase when the temperature drops from T1 to T1' increases from W to W' as schematically shown in FIG. 6. The remaining liquid droplets are introduced into and evaporated in the compressor 1 so that they contribute to reduction of the work of the compressor 1.

Figure 9A:
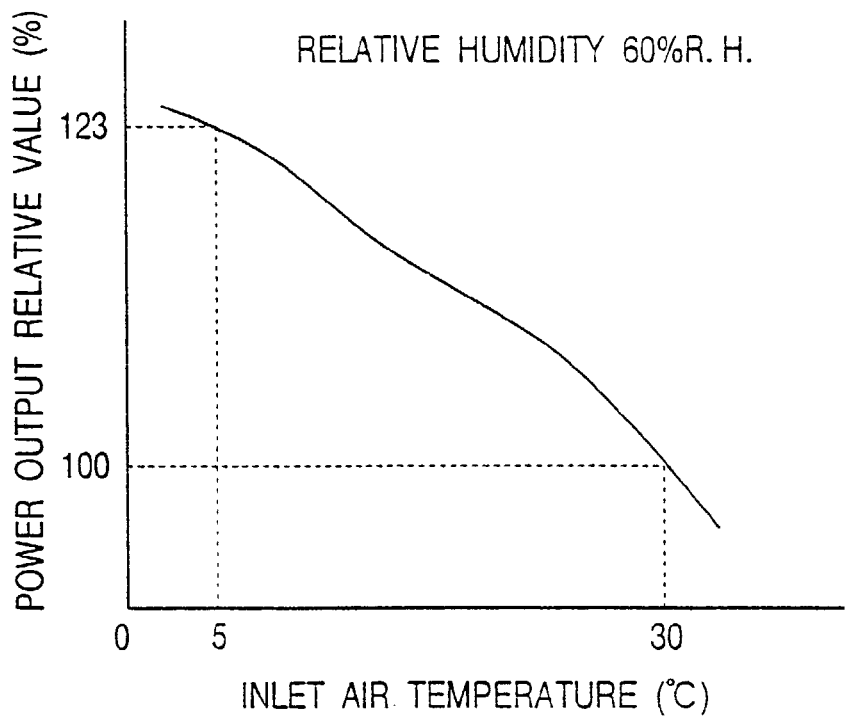
FIGS. 9(a) and 9(b) are diagrams illustrating a relationship between the water drop injection amount and the increasing ratio of the power output of the gas turbine.
Figure 9B:
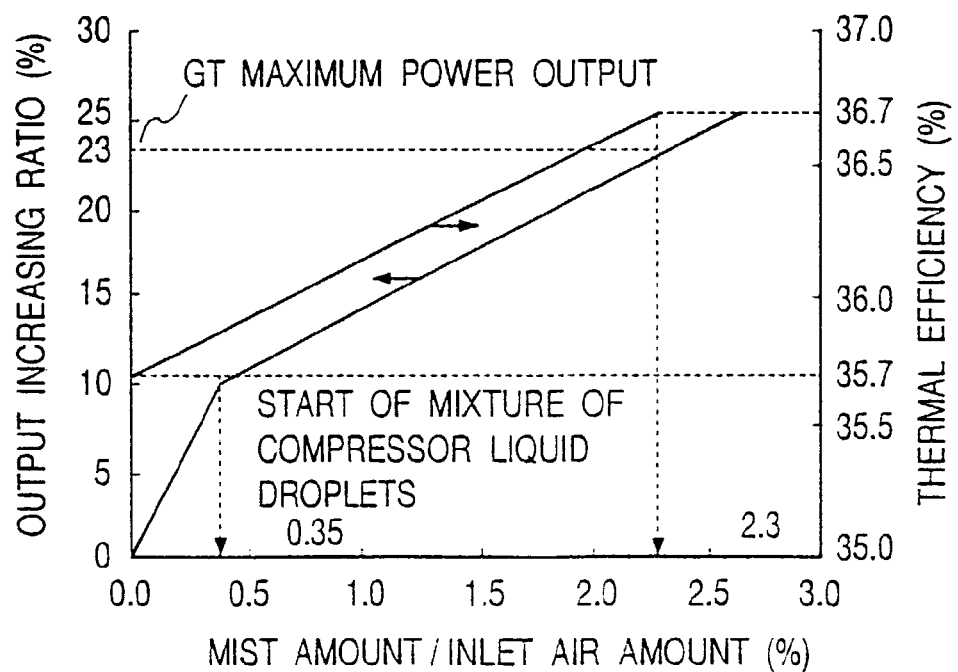

FIGS. 9(a) and 9(b) illustrate a relationship between the water drop injection amount and the increasing rate of the power output of the gas turbine. FIG. 9(a) illustrates a variation of the power output relative value to the inlet air temperature, and FIG. 9(b) illustrates a relationship between the injection amount and the power output increase.

Values illustrated are obtained where the calculation conditions are, for example, 35° C. in ambient condition, 53% in relative humidity, 417 kg/s in compressor air capacity characteristic, 0.915 in compressor polytropic efficiency, 0.89 in turbine adiabatic efficiency 1,290° C. in combustion temperature, 20% in compressor extraction quantity, 1.48 MPa in discharge pressure, and 0.25 MPa in evaporation stage pressure drop. If water at room temperature is injected, then 0.35% of the inlet air flow rate is evaporated in the inlet air compartment before it flows into the compressor. Consequently, as the inlet air temperature drops and the density of air rises, the inlet mass flow rate of the compressor increases by several %, which contributes to power output increase of the gas turbine. The remaining injected water accompanies the air flow and is sucked, while remaining in the form of liquid droplets, into the compressor, in which it is evaporated and contributes to reduction of the work of the compressor.

The thermal efficiency augmentation ratio upon 2.3% injection is 2.8% in relative value. The consumed water amount necessary to recuperate the power output of the gas turbine to an output exhibited upon 5° C. base load operation is approximately 2.3 weight % of the inlet mass flow rate. Details of output increase when operation is performed until the output of the gas turbine is recuperated to a maximum value, are roughly estimated as follows: the portion which is based on cooling before the compressor 1 is entered is approximately 35%; the portion which is based on cooling by evaporation in the inside of the compressor is approximately 37%; and the portion which is based on a difference in amount of the working fluid which passes through the turbine and the compressor and increase of the low pressure specific heat arising from steam contained in the working fluid is approximately 28%.

Though not shown on the scale of FIGS. 9(a) and 9(b), the injection water amount may be further increased so that power output increase up to an allowable power output level can be obtained with an injection flow rate of approximately 5 weight %. As the injection amount increases, the evaporation action of water droplets in the compressor 1 has an increasing influence upon the power output increase by an action (cooling action) outside the compressor 1.

It is considered that the evaporation amount of liquid droplets introduced into the compressor 1 by the atomizing nozzles 11 on the front stage side is preferably made larger than the evaporation amount on the rear stage side and to evaporate liquid droplets introduced into the compressor 1 principally on the front stage side is effective to reduction in power.

Liquid droplets are injected by such an amount that the temperature of compressed air discharged from the compressor 1 is lowered by 5° C. or more from that prior to the injection. From the point of view to achieve further increase in power output, the amount of liquid droplets is set to such a degree that the temperature is lowered by 25° C. or more. It is to be noted that the upper limit can be determined from the point of view of practical use. For example, it is reasonable to set the amount of liquid droplets so that the temperature is lowered by 50° C. or less.

A further aspect of the embodiment of FIG. 1 will now be described.

The embodiment of FIG. 1 further includes a mechanism which can control the temperature of liquid droplets to be injected.

The embodiment of FIG. 1 may include a heat recovery boiler 30 wherein exhaust gas of the turbine 2 is used as a heat source. Further, through not shown in FIG. 1, a steam turbine which is driven by steam generated by the heat recovery boiler 30 maybe provided. Further, at least a generator which is driven by the gas turbine or the steam turbine may be provided. The air supply means 12 includes a path 12A for supplying steam generated by the heat recovery boiler 30 to the atomizing nozzles 11, and a control valve 14c is disposed in the path.

Inlet air 6 passes through the louver 9 and comes into the inlet air compartment 10, and water of the feed water tank 17 passes through the control valve 15 of a predetermined opening and then through the feed water means 13 so that fine liquid droplets are injected from the atomizing nozzles 11. In this instance, the steam supply amount is controlled by the control valve 14c.

Further, where compressed air is supplied to the atomizing nozzles 11 additionally, the amount of compressed air can be controlled by the control valve 14a provided in the path from the accumulator 29 to the atomizing nozzles 11.

Consequently, since the heating temperature can be adjusted, the temperature of liquid droplets to be injected and so forth are controlled. The inlet air 6 contains the liquid droplets of the desired temperature to form a mist flow, which flows into the compressor 1 after it cools the inlet air. The liquid droplets contained in the inlet air are evaporated in the inside of the compressor 1 and cool the compressed air.

According to the present embodiment, in addition to achievement of augmentation of the power output of the gas turbine of the embodiment 1 and augmentation of the thermal efficiency of the gas turbine, the evaporation rate of liquid droplets can be controlled by controlling the temperature of injection liquid. If the water temperature is raised, then evaporation of liquid droplets can be shifted to the front stage side of the compressor. Consequently, the work amount of the compressor 1 can be further reduced. While the temperature of water droplets to be injected varies depending upon conditions, the appropriate range for practical use is 10 to 80° C. As a method of controlling the water temperature, in addition to a method of mixing steam into the injection nozzles, control of the bleed extraction gas temperature of the compressor or a system which controls using temperature controlling means such as a heater 51 provided at a suitable location of the feed water means 13 may be employed.

Where the air supply means 12 described hereinabove is not provided, it is effective to provided the heater 51. In the method shown in FIG. 1 wherein steam is supplied, provision of the heater 51 is effective in a combined plant, particularly a cogeneration plant, since steam can be utilized effectively. The heater 51 is effective since steam of the heat recovery boiler 30 can be utilized even where separately provided heating means or the like is not disposed. It is to be noted that separate steam generation means may be provided.

It also is effective to mix combustible liquid having a high steam partial pressure into injection water. For example, mixture of water and alcohol or the like is injected from the atomizing nozzles 11. For example, antifreezing solution is used. Where glycerin or ethylene glycol is added to water to form mist, the reduction efficiency of the power of the compressor is high since it volatilizes at a low temperature. Further, since the freezing point drops, there is no possibility of icing of liquid droplets even in winter or the like.

For a concrete construction in a season such as winter, glycerin or ethylene glycol is added into the feed water tank 17 and stored as mixture in the feed water tank 17.

The gas turbine of the present embodiment can augment the thermal efficiency also upon part load operation.

Steam may be supplied into inlet air to be introduced into the compressor 1 in the embodiment of FIG. 1.

More particularly, the gas turbine includes a path 12A for supplying steam generated by the heat recovery boiler 30 to the air supply means 12 so that steam supplied from the atomizing nozzles 11 can be injected.

Inlet air 6 passes through the louver 9 and comes into the inlet air compartment 10, and the control valve 15 is closed. Steam generated by the heat recovery boiler 30 passes through the control valve 14c of a predetermined opening and then through the air supply means 12 so that it is injected from the atomizing nozzles 11. If it is assumed that the air supply means 12 is not provided but only the feed water means 13 is provided, though not shown, the gas turbine may be constructed such that, in place of supply water from the feed water tank 17, the steam is supplied from the feed water means 13 to the atomizing nozzles 11. Or, though not shown, in addition to the atomizing nozzles 11, separately provided steam supplying nozzles to which steam generated by the heat recovery boiler 30 is supplied may be disposed. It is to be noted that the amount, the temperature or the like of steam to be injected into inlet air is controlled, although it is different depending upon the steam source, by an aimed temperature of inlet air to enter the compressor 1.

The inlet air 6 whose temperature has been controlled to the desired temperature is flowed into the compressor 1.

According to the feature just described of the embodiment of FIG. 1, for a thermal efficiency augmentation method for part load operation, the following method can be used.

For example, in winter or a like season, when such a situation that the demand for power is less and part load operation cannot be avoided is entered, by injecting steam into inlet air as described above, the inlet air temperature which has been, for example, approximately 10° C. can be raised to approximately 50° C. before it is supplied to the compressor 1.

Since the temperature of inlet air can be raised by injecting steam into the entrance of the compressor, the density of the air decreases and the inlet mass flow rate of the compressor decreases, and consequently, the power output of the gas turbine can be reduced while suppressing drop of the thermal efficiency. This is because base load operation can be performed while avoiding part load operation of the gas turbine.

This feature is effective when the demand is reduced depending upon a season since, even when the requested load decreases and the power output is to be reduced, since the operation having the thermal efficiency higher than that achieved by a conventional part load operation method by IGV control or the like can be performed. Particularly in a plant wherein steam is generated using exhaust gas of a gas turbine such as a combined cycle plant or a cogeneration plant, also effective utilization of surplus steam can be achieved since residual steam can be used for generation.

It is to be noted that, as the case may be, instead of using steam for a heat recovery boiler, separate steam generation means may be provided.

The embodiment of FIG. 1 further may include means such as a nozzle for sending pressurized air to a mid stage of a compressor.

A flow control valve 47 may be provided in a line 59 for feeding compressed air supplied from a compressed air source 43 to a mid stage of the compressor 1. The compressed air source 43 can supply air from a compressor installed outside or an atomization compressor for fuel injection. Alternatively, although the effect is somewhat inferior air may be recirculated from a discharging location of the compressor 1. In this instance, since a lower temperature of the bleed provides a higher thermal efficiency, cooling means 48 is preferably provided intermediately of the feed air line 59.

Figure 10:
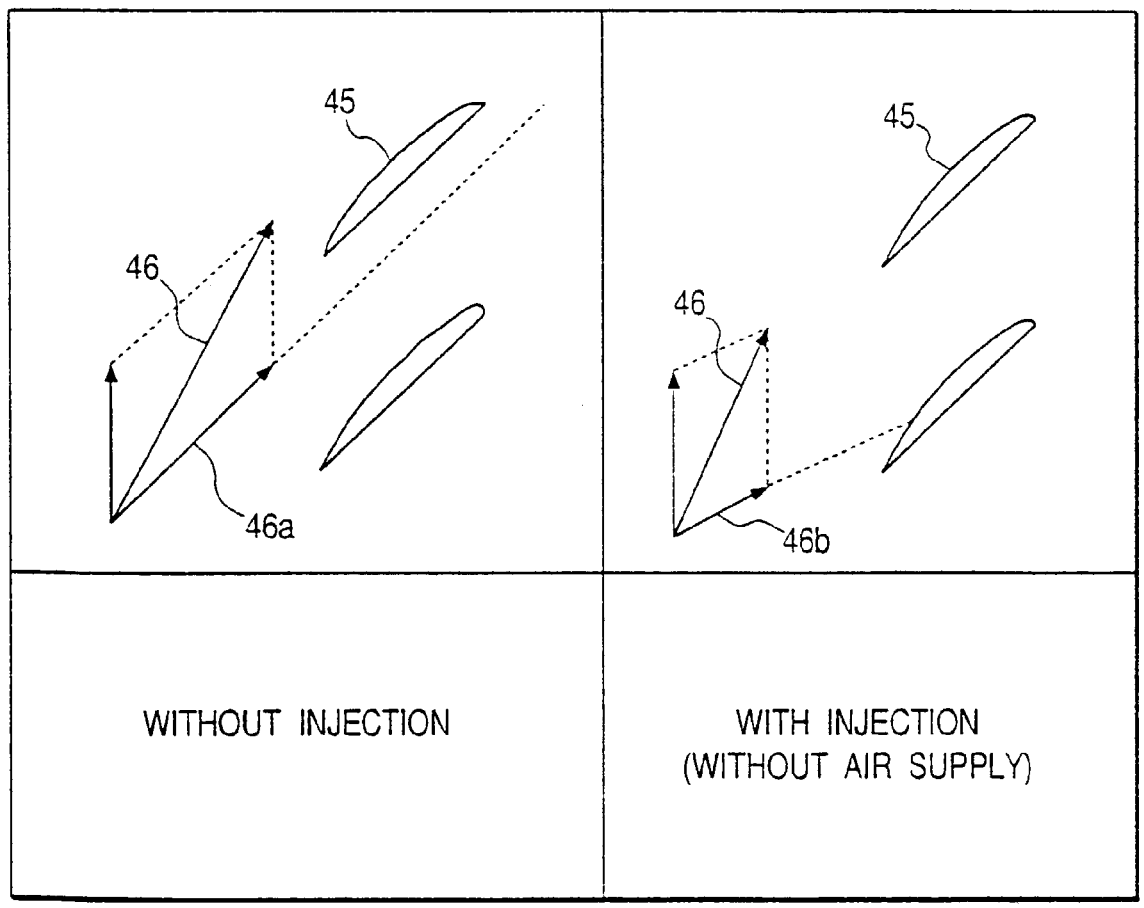
FIG. 10 is a diagrammatic view illustrating a relationship between the axial velocity and the velocity triangle.

If liquid droplets 37 are evaporated to cool air in the compressor 1, the density of the air becomes higher, and consequently, an axial velocity 46 drops. Consequently, the velocity triangle is distorted as seen in FIG. 10, and the incident angle of an air flow to a blade 45 is displaced from a designed value like from 46a to 46b, and a reverse flow develops along the face of the blade. Consequently, the adiabatic efficiency of the compressor 1 drops. As the adiabatic efficiency drops, the discharging temperature of the compressor 1 rises, and as a result, the reduction effect of the work of the compressor decreases. Since it is considered that this phenomenon becomes more significant as the injection water amount increases, limitation is applied to the injection amount in a practical phase. In order to eliminate this, the axial velocity should be recuperated by feeding air to the compressor 1. As the position at which air is fed, a position at which evaporation of water droplets is substantially completed is selected effectively. Preferably the feed air amount is selected as a function of the injection amount so that the axial velocity may be held at is designed value even if the injection amount varies.

The opening of the control valve 15 for a water amount is increased and the opening of the flow control valve 47 is increased by an instruction signal from the function generator 24 in response to an increase of an aimed power output based on the power demand signal 25.

The amount of water to be supplied from the control valve 15 and the amount of compressed air to be supplied from the flow control valve 47 may have a relationship of a monotone increasing function.

Upon decrease of the power output, the openings of the valves mentioned above are controlled so as to be decreased.

By this construction, the restriction to the injection amount is moderated, and the width of power decrease of the compressor per unit air flow rate increases since no degradation of the adiabatic effect is invited. Further, also the effect that the power output increase of the gas turbine is increased by increase of operating liquid by air feeding is exhibited.

Figure 3:
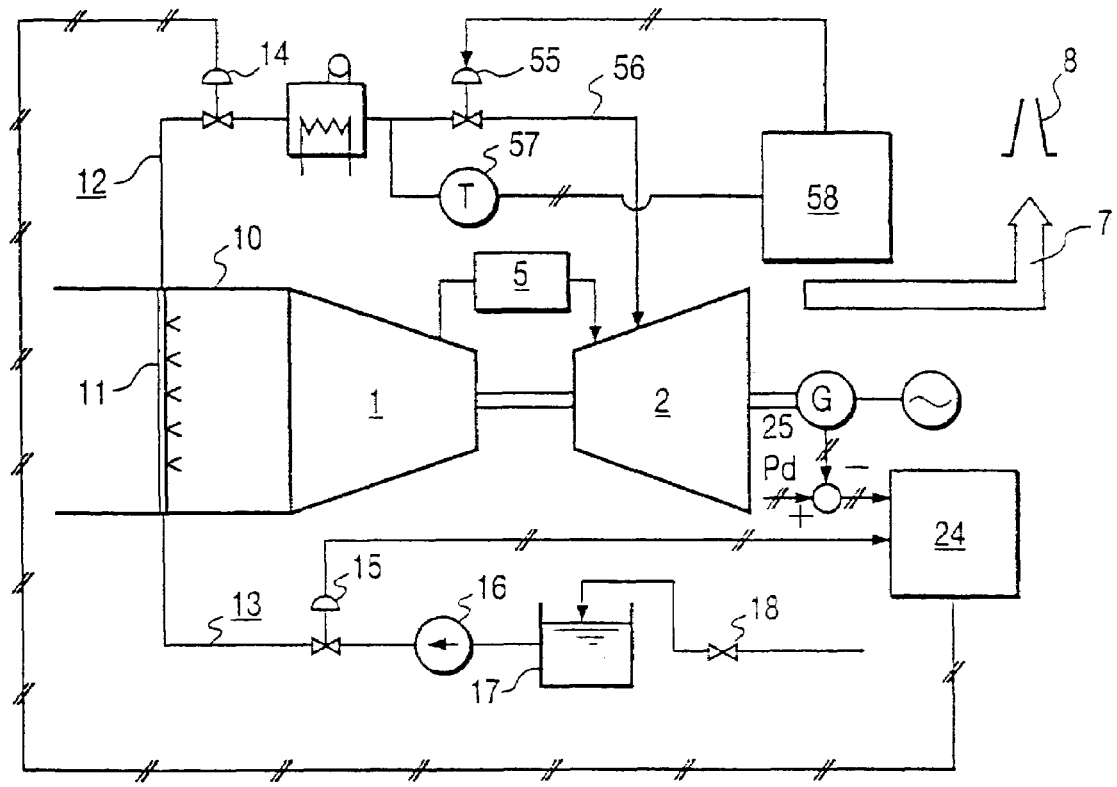
FIG. 3 is a similar view showing a further embodiment of the present invention.

A third embodiment of the present invention will be described with reference to FIG. 3.

The third embodiment is constructed such that, in a gas turbine of the type wherein bleed extraction of the compressor 1 is supplied into a cooling flow path formed in a turbine blade to cool the turbine blade, the bleed extraction flow rate is controlled in response to the temperature of the bleed extraction of the compressor.

Instead of feeding compressed air to a mid stage of the compressor 1 of the type wherein a turbine blade is cooled, the flow rate after the bleed extraction stage can substantially be increased by decreasing the bleed extraction quantity from a bleed extraction line 56 of the compressor 1, which is provided for cooling the turbine blade, in conformity with a drop of the temperature of the bleed extraction gas.

To this end, a flow control valve 55 or a motor valve with an intermediate opening set is provided in the bleed extraction line 56.

If water droplets are evaporated to cool air in the compressor 1, then since also the temperature of the bleed extraction drops, the amount of air required for bleed extraction of the compressor for cooling the blades of the turbine may be small. The bleed extraction may have a relationship of a monotone decreasing function with the flow control valve 55 using an instruction signal from a bleed extraction amount control function generator 58 in response to a decrease of an aimed bleed extraction quantity based on a temperature signal of a temperature detector 57 which detects the temperature of the bleed extraction.

Where a motor valve with an intermediate opening set is used, the opening of the valve is controlled to a predetermined value in response to a temperature when the bleed extraction temperature reaches a preset value.

Since the amount of air of the compressor at a stage following the bleed extraction point can be increased by decreasing the bleed extraction amount, the axial velocity is recuperated and the adiabatic efficiency of the compressor is augmented, and the temperature of gas at the exit of the compressor drops and the power of the compressor per unit air amount decreases. Further, since the amount of air supplied to the turbine increases, the shaft power increases. Those actions further augment both of the power output and the heat efficiency.

As regards the embodiments which relate to a gas turbine described above, they can be applied to a combined cycle plant which employs the gas turbine and includes a heat recovery boiler which generates steam using exhaust gas from the turbine as a heat source and a steam turbine which is driven by the steam generated by the heat recovery boiler.

Consequently, augmentation of the power output and augmentation of the heat efficiency of the combined cycle plant can be achieved by such a simple apparatus which is suitable for practical use as described above.

Further, even if each of the embodiments is regarded as a single unit of a compressor, reduction of required power of the compressor can be realized by a simple apparatus.

In particular, if such fine liquid droplets as described above are injected into inlet air supplied to the entrance of a compressor so that they are evaporated in the compressor, then the following principal effects described above can be achieved. In this instance, for the gas to be supplied into the compressor as the inlet air, ammonia, freon and so forth can be used in addition to air. Further, for liquid droplets to be injected, where air is used, water and so forth can be used as indicated in the examples of gas turbine described hereinabove. In the case of a compressor wherein ammonia is employed as the inlet air, liquid ammonia can be injected, but where freon gas is employed as the inlet air, liquid freon can be injected.

Comparing with an alternative case wherein liquid droplets and mist are not mixed into inlet air to enter the compressor, part of them is evaporated to cool the inlet air before it enters the entrance of the compressor 1 while water droplets can be evaporated continuously from the entrance portion of the compressor, and consequently, the gas temperature in the compressor exhibits a continuous drop. Also the discharge temperature drops. Furthermore, when the liquid droplets introduced into the compressor are evaporated in the compressor to increase the mass flow rate and then evaporation is substantially completed in the compressor, then the gas in the compressor is subject to adiabatic compression, and there is an effect similar to that of an increase of the working fluid. If the injection amount is increased, then also the compressor power ratio (isoentropic compression work of dry air/compression work in an isoentropic two phase compression process including evaporation of liquid) can be further reduced.

Further, even if each of the embodiments described above is regarded as a liquid droplet injection apparatus for injecting liquid droplets into inlet air of the compressor of the gas turbine, augmentation of the power output and augmentation of the thermal stress of the gas turbine which includes the apparatus can be realized with a simple apparatus.

Having now fully described the invention, it will be apparent to one of ordinary skill in the art that many changes and modifications can be made thereto without departing from the spirit and scope of the invention as set forth herein.

What is claimed is:

1. A gas turbine, comprising:
   a compressor for compressing and discharging air supplied thereto;
   a combustor in which fuel is combusted with the air discharged from said compressor;
   a turbine driven by the combusted gas of said combustor; and
   a liquid droplet injection device for injecting fine liquid droplets in inlet air to be supplied to said compressor;

said liquid droplet injection device including atomizing nozzles disposed on the upstream side of the compressor;

feed water means connected to said atomizing nozzles; and a control device for controlling an amount of liquid droplets to be injected from said atomizing nozzles such that the liquid droplets are partially evaporated in the inlet air to cool the inlet air to be supplied into said compressor, and the remaining injected liquid droplets are supplied into said compressor together with the inlet air and are further evaporated in said compressor.

2. A gas turbine according to claim 1, wherein said control device includes means for controlling the amount of liquid droplets to be injected in response to an ambient temperature.

3. A gas turbine according to claim 1, wherein said control device includes means for controlling the amount of liquid droplets to be injected in response to an output of the gas turbine.

4. A gas turbine according to claim 2, wherein said control device includes means for controlling the amount of liquid droplets to be an amount equal to 0.2 to 5.0 weight % of the mass flow rate of the air.

5. A gas turbine according to claim 3, wherein said control device includes means for controlling the amount of liquid droplets to be an amount equal to 0.2 to 5.0 weight % of the mass flow rate of the air.

6. A gas turbine according to claim 1, wherein said liquid droplet injection device includes means for injecting liquid droplets having droplet diameters principally from 1 to 50 μm.

7. A gas turbine according to claim 2, wherein said liquid droplet injection device includes means for injecting liquid droplets having droplet diameters principally form 1 to 50 μm.

8. A gas turbine according to claim 3, wherein said liquid droplet injection device includes means for injecting liquid droplets having droplet diameters principally from 1 to 50 μm.

* * * * *